(12) United States Patent
Tamaru et al.

(10) Patent No.: US 10,514,591 B2
(45) Date of Patent: Dec. 24, 2019

(54) CAMERA APPARATUS, IMAGE PROCESSING DEVICE, AND IMAGE PROCESSING METHOD

(71) Applicant: FUJIFILM Corporation, Tokyo (JP)

(72) Inventors: Masaya Tamaru, Saitama (JP); Yasunobu Kishine, Saitama (JP); Hiroyuki Oshima, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 75 days.

(21) Appl. No.: 15/715,990

(22) Filed: Sep. 26, 2017

(65) Prior Publication Data

US 2018/0017847 A1 Jan. 18, 2018

Related U.S. Application Data

(63) Continuation of application No. PCT/JP2015/082895, filed on Nov. 24, 2015.

(30) Foreign Application Priority Data

Mar. 27, 2015 (JP) .................................. 2015-066574

(51) Int. Cl.
 *G03B 17/02* (2006.01)
 *G06T 5/00* (2006.01)
 (Continued)

(52) U.S. Cl.
 CPC ............. *G03B 17/02* (2013.01); *G03B 15/00* (2013.01); *G03B 17/56* (2013.01); *G03B 17/561* (2013.01);
 (Continued)

(58) Field of Classification Search
 CPC combination set(s) only.
 See application file for complete search history.

(56) References Cited

U.S. PATENT DOCUMENTS

2007/0242140 A1* 10/2007 Kimura ............... H04N 5/2171
 348/231.99
2009/0306477 A1 12/2009 Togino
 (Continued)

FOREIGN PATENT DOCUMENTS

CN 101484835 A 7/2009
CN 102314672 A 1/2012
 (Continued)

OTHER PUBLICATIONS

Japanese Office Action with the English language translation issued in corresponding Japanese Application No. 2017-509159 and dated Jul. 31, 2018.

(Continued)

*Primary Examiner* — Alexander Gee
(74) *Attorney, Agent, or Firm* — Birch, Stewart, Kolasch & Birch, LLP

(57) ABSTRACT

A camera apparatus (10) includes a degraded region information storage unit (24) that stores degraded region information for each direction in which degraded region data and an imaging direction are associated with each other, a direction recognition unit (30) that recognizes the imaging direction, and an image correction unit (32) that acquires degraded region data which is associated with the imaging direction recognized by the direction recognition unit (30) on the basis of the degraded region information for each direction and performs an image quality improvement process for the image data on the basis of a peculiar degraded region indicated by the degraded region data. The peculiar degraded region is a region related to a degradation element which is caused by at least one of the dome cover or the optical system and is based on at least one of a spatial frequency or signal intensity.

20 Claims, 19 Drawing Sheets

(51) Int. Cl.
  *H04N 5/232* (2006.01)
  *H04N 5/217* (2011.01)
  *G03B 17/56* (2006.01)
  *H04N 5/225* (2006.01)
  *G03B 15/00* (2006.01)

(52) U.S. Cl.
  CPC ............. *G06T 5/006* (2013.01); *H04N 5/217* (2013.01); *H04N 5/225* (2013.01); *H04N 5/232* (2013.01); *H04N 5/23216* (2013.01); *H04N 5/23296* (2013.01)

(56) References Cited

U.S. PATENT DOCUMENTS

| | | | | |
|---|---|---|---|---|
| 2010/0013962 A1* | 1/2010 | Hamano | ................ | G03B 17/02 348/241 |
| 2012/0169870 A1* | 7/2012 | Jain | .................... | G02B 27/0025 348/143 |
| 2013/0223834 A1 | 8/2013 | Jikihara et al. | | |
| 2014/0248045 A1* | 9/2014 | Wada | ................... | G03B 17/561 396/427 |

FOREIGN PATENT DOCUMENTS

| | | |
|---|---|---|
| JP | 2004-289562 A | 10/2004 |
| JP | 2004-320526 A | 11/2004 |
| WO | 2009/013962 A1 | 1/2009 |
| WO | WO 2012/063482 A1 | 5/2012 |

OTHER PUBLICATIONS

International Search Report and Written Opinion of the International Searching Authority (Forms PCT/ISA/210 and PCT/ISA/237) for International Application No. PCT/JP2015/082895, dated Feb. 16, 2016, with English translations.

Chinese Office Action and Search Report for counterpart Chinese Application No. 201580077659.X, dated Jul. 1, 2019, with English translation.

* cited by examiner

FIG. 9

| φ \ θ | 0° | 1° | ... | 359° |
|---|---|---|---|---|
| 0° | (0, 325),<br>(1, 325),<br>...,<br>(639, 403) | (0, 325),<br>(1, 325),<br>...,<br>(639, 403) | ... | (0, 325),<br>(1, 325),<br>...,<br>(639, 403) |
| 1° | (0, 326),<br>(1, 327),<br>...,<br>(639, 404) | (0, 327),<br>(1, 328),<br>...,<br>(639, 404) | ... | (0, 326),<br>(1, 327),<br>...,<br>(639, 404) |
| ... | ... | ... | ... | ... |
| 90° | NONE | NONE | ... | NONE |

| 41 | 43 | 42 |
|---|---|---|
| IMAGING DIRECTION DATA | DEGRADATION CHARACTERISTIC DATA | DEGRADED REGION DATA |
| ⋮ | ⋮ | ⋮ |

40

CAMERA APPARATUS, IMAGE PROCESSING DEVICE, AND IMAGE PROCESSING METHOD

CROSS-REFERENCE TO RELATED APPLICATIONS

The present application is a Continuation of PCT International Application No. PCT/JP2015/082895 filed on Nov. 24, 2015 claiming priority under 35 U.S.C § 119(a) to Japanese Patent Application No. 2015-066574 filed on Mar. 27, 2015. Each of the above applications is hereby expressly incorporated by reference, in their entirety, into the present application.

BACKGROUND OF THE INVENTION

1. Field of the Invention

The present invention relates to a camera apparatus, an image processing device, and an image processing method, and more particularly, to a technique that reduces the influence of a degradation element caused by at least one of a dome cover or an optical system in image data.

2. Description of the Related Art

For example, in the field of surveillance cameras, a dome cover is mounted on a camera unit to prevent an extraneous material from being attached to an optical system and to protect the camera unit from impact.

The camera unit on which the dome cover is mounted captures an image of an object through the dome cover. The captured image is affected by the optical characteristics of the dome cover. Therefore, in a case in which the dome cover has a unique shape and has non-uniform optical characteristics, the quality of the captured image deteriorates.

JP2004-289562A discloses a video camera that includes correction processing means for correcting the "distortion" of an image caused by a cover covering an imaging apparatus. The video camera disclosed in JP2004-289562A reduces an image portion captured through a tapered portion of the cover in the Y-axis direction to correct the distortion of the captured image.

SUMMARY OF THE INVENTION

As described above, the quality of the image captured by the camera apparatus is affected by the dome cover.

It is preferable that the dome cover is homogeneously manufactured with high accuracy. However, in some cases, the dome cover originally has a non-uniform shape and non-uniform optical characteristics due to design requirements or unexpected line blur or unexpected line streaks are generated in the dome cover in a manufacturing stage. In particular, in some cases, in a case in which an imaging direction is changed by a pan/tilt mechanism, the dome cover needs to cover an angular range wider than that of a hemisphere in order to cover the entire movable range of the imaging direction. In recent years, with a reduction in the size of a camera unit, there is a demand for minimizing the size of the dome cover. Therefore, the dome cover needs to originally have a unique small shape corresponding to the movable range or arrangement space of the camera unit. For example, there is a dome cover having a complicated shape which is a combination of a curved portion (for example, a spherical portion) and a planar portion (for example, a tapered portion). As such, the dome cover that covers a wide imaging range with a limited size has a complicated shape and the degree of difficulty in manufacturing the dome cover tends to be high. Therefore, peculiar degraded portions, such as line blur and line streaks, are likely to be generated in the dome cover.

A captured image which is acquired through the dome cover having the peculiar degraded portions, such as line blur and line streaks, is affected by the peculiar degraded portions and includes image blur and image streaks (dimming streaks). As a result, the quality of the image deteriorates.

The video camera disclosed in JP2004-289562A can appropriately respond to the "distortion" (that is, a geometric degradation element) of the image caused by the dome cover. However, it is difficult for the video camera to appropriately respond to other degradation elements. In particular, it is difficult to appropriately remove or reduce "degradation elements based on a spatial frequency" or "degradation elements based on signal intensity", such as image blur and image streaks, using the method disclosed JP2004-289562A.

The invention has been made in view of the above-mentioned problems and an object of the invention is to reduce the influence of a degradation element which is caused by at least one of a dome cover or an optical system and is based on at least one of a spatial frequency or signal intensity and to provide high-quality image data.

According to an aspect of the invention, there is provided a camera apparatus comprising: a dome cover; a camera unit including an optical system that is provided on a rear surface side of the dome cover and an imaging element that outputs image data on the basis of imaging light received through the dome cover and the optical system; a direction driving unit that is capable of driving the optical system to change an imaging direction; a degraded region information storage unit that stores degraded region information for each direction in which the imaging direction and degraded region data indicating a peculiar degraded region in the image data are associated with each other; a direction recognition unit that recognizes the imaging direction; and an image correction unit that acquires the degraded region data associated with the imaging direction recognized by the direction recognition unit on the basis of the degraded region information for each direction and performs an image quality improvement process for the image data on the basis of the peculiar degraded region indicated by the degraded region data. The peculiar degraded region is a region related to a degradation element which is caused by at least one of the dome cover or the optical system and is based on at least one of a spatial frequency or signal intensity.

According to this aspect, it is possible to provide high-quality image data, using the image quality improvement process that reduces the influence of the degradation element which is caused by at least one of the dome cover or the optical system and is based on at least one of a spatial frequency or signal intensity. In particular, since the image quality improvement process is performed using the degraded region information for each direction in which the imaging direction and the degraded region data indicating the peculiar degraded region in the image data are associated with each other, it is possible to perform the process at a high speed while ensuring high processing accuracy.

Preferably, the degradation element is caused by a refractive index of at least one of the dome cover or the optical system.

According to this aspect, it is possible to reduce the influence of the degradation element caused by the refractive index and to improve the image quality of the peculiar degraded region related to the degradation element based on the spatial frequency.

Preferably, the degradation element is caused by transmittance of at least one of the dome cover or the optical system.

According to this aspect, it is possible to reduce the influence of the degradation element caused by the transmittance and to improve the image quality of the peculiar degraded region related to the degradation element based on the signal intensity.

Preferably, the degradation element is at least one of image blur or image streaks.

According to this aspect, it is possible to reduce the influence of image blur and/or image streaks from the image data.

Preferably, the image quality improvement process includes at least one of a deconvolution process, an unsharp masking process, or a gain adjustment process.

According to this aspect, it is possible to effectively reduce the influence of the degradation element based on at least one of the spatial frequency or the signal intensity in the image data.

Preferably, the peculiar degraded region is a region indicating the degradation element and the image correction unit performs the image quality improvement process for the peculiar degraded region.

According to this aspect, it is possible to reduce the influence of the "degradation element based on at least one of the spatial frequency or the signal intensity" in the peculiar degraded region of the image data.

Preferably, the image correction unit analyzes the image data to specify an image-quality-degraded portion indicating the degradation element in the peculiar degraded region of the image data and performs the image quality improvement process for the image-quality-degraded portion.

According to this aspect, the image-quality-degraded portion of the peculiar degraded region is specified and the image quality improvement process is performed for the image-quality-degraded portion. Therefore, it is possible to more strictly reduce the influence of the "degradation element based on at least one of the spatial frequency or the signal intensity".

Preferably, the degraded region information storage unit stores the degraded region information for each direction which is specified on the basis of the peculiar degraded region determined according to optical characteristic information indicating optical characteristics of at least one of the dome cover or the optical system, camera specification information indicating characteristics of the camera unit, and direction information indicating a range of the imaging direction which is capable of being changed by the direction driving unit.

According to this aspect, a region that is expected to be affected by the "degradation element based on at least one of the spatial frequency or the signal intensity" in the image data is determined as the peculiar degraded region. Therefore, it is possible to effectively reduce the influence of the degradation element.

Preferably, the camera apparatus further comprises: a degraded region recognition unit that analyzes the image data to specify the peculiar degraded region; and a process control unit that controls at least the imaging element, the direction driving unit, the degraded region information storage unit, and the degraded region recognition unit.

Preferably, the process control unit directs the imaging element to output the image data related to a plurality of imaging directions, directs the degraded region recognition unit to specify the peculiar degraded region related to each of the plurality of imaging directions, and stores the degraded region information for each direction in which the imaging direction and the degraded region data indicating the peculiar degraded region specified by the degraded region recognition unit are associated with each other in the degraded region information storage unit in advance.

According to this aspect, it is possible to acquire the degraded region information for each direction on the basis of measured data and to store the degraded region information for each direction in the degraded region information storage unit. Therefore, it is possible to effectively perform the image quality improvement process.

Preferably, the process control unit directs the degraded region recognition unit to specify degradation characteristics of the peculiar degraded region related to each of the plurality of imaging directions and stores the degraded region information for each direction in which the degraded region data, the imaging direction, and the degradation characteristics are associated with each other in the degraded region information storage unit.

According to this aspect, the degraded region data and the degradation characteristics are stored in the degraded region information storage unit so as to be associated with each other with respect to each imaging direction.

Preferably, the image correction unit acquires the degraded region data and the degradation characteristics associated with the imaging direction recognized by the direction recognition unit on the basis of the degraded region information for each direction and performs the image quality improvement process on the basis of the degradation characteristics and the peculiar degraded region indicated by the degraded region data.

According to this aspect, the image quality improvement process corresponding to the degradation characteristics is performed. Therefore, it is possible to very effectively reduce the influence of the degradation element based on at least one of the spatial frequency or the signal intensity.

Preferably, the image correction unit performs a distortion correction process of correcting distortion of the optical system for the image data before the image quality improvement process.

According to this aspect, the image quality improvement process is performed for the image data on which the influence of the distortion of the optical system has been reduced. Therefore, it is possible to very effectively reduce the influence of the degradation element.

Preferably, the degraded region data is coordinate data indicating a position of each pixel forming the peculiar degraded region in the image data.

According to this aspect, the peculiar degraded region can be simply and accurately indicated by the coordinate data.

Preferably, the degraded region data is function data indicating the peculiar degraded region in the image data.

According to this aspect, the peculiar degraded region can be simply indicated by the degraded region data.

Preferably, the dome cover includes a discontinuous portion in which a change in the curvature of at least a rear surface of a front surface and the rear surface is discontinuous.

According to this aspect, it is possible to reduce the influence of the degradation element caused by the dome cover including the discontinuous portion.

Preferably, the dome cover includes a curved portion in which at least the rear surface of the front surface and the rear surface is a curved surface and a planar portion in which at least the rear surface of the front surface and the rear surface is a flat surface and the discontinuous portion is formed by a connection portion between the curved portion and the planar portion.

According to this aspect, it is possible to reduce the influence of the degradation element caused by the dome cover in which the discontinuous portion is provided between the curved portion and the planar portion.

Preferably, the peculiar degraded region includes a region of the image data which is related to the degradation element caused by the discontinuous portion of the dome cover.

According to this aspect, it is possible to reduce the influence of the degradation element caused by the discontinuous portion of the dome cover.

Preferably, the peculiar degraded region includes a region of the image data which is related to the degradation element caused by a light shielding portion of the dome cover.

According to this aspect, it is possible to reduce the influence of the degradation element caused by the light shielding portion of the dome cover.

According to another aspect of the invention, there is provided an image processing device that acquires image data and imaging direction data indicating an imaging direction of the image data, acquires degraded region data which indicates a peculiar degraded region of the image data and is associated with the imaging direction data on the basis of degraded region information for each direction in which the degraded region data and the imaging direction are associated with each other, and performs an image quality improvement process for the image data on the basis of the peculiar degraded region indicated by the acquired degraded region data.

According to still another aspect of the invention, there is provided an image processing method comprising: a step of acquiring image data which is output from an imaging element on the basis of imaging light received through a dome cover and an optical system; a step of recognizing an imaging direction when the image data is acquired; and a step of acquiring degraded region data which indicates a peculiar degraded region in the image data and is associated with the imaging direction when the image data is acquired on the basis of degraded region information for each direction in which the degraded region data and the imaging direction are associated with each other and performing an image quality improvement process for the image data on the basis of the peculiar degraded region indicated by the degraded region data. The peculiar degraded region is a region related to a degradation element which is caused by at least one of the dome cover or the optical system and is based on at least one of a spatial frequency or signal intensity.

According to the invention, it is possible to accurately perform the image quality improvement process that reduces the influence of the degradation element which is caused by at least one of the dome cover or the optical system and is based on at least one of a spatial frequency or signal intensity at a high speed and to provide high-quality image data.

BRIEF DESCRIPTION OF THE DRAWINGS

FIG. 9 is a conceptual diagram illustrating a detailed example of the degraded region information for each direction.

DESCRIPTION OF THE PREFERRED EMBODIMENTS

Embodiments of the invention will be described with reference to the accompanying drawings. In the following embodiments, an example in which the invention is applied to a camera apparatus will be described.

Figure 1:
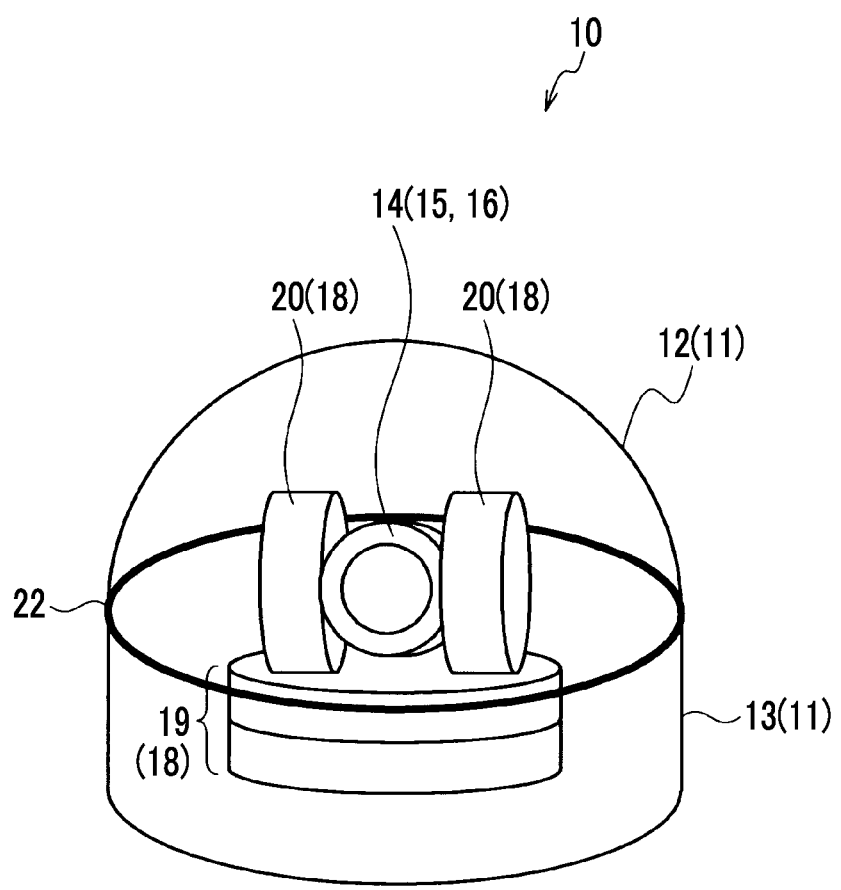
FIG. 1 is a diagram illustrating the outward appearance of an example of a camera apparatus.

FIG. 1 is a diagram illustrating the outward appearance of an example of a camera apparatus 10.

The camera apparatus 10 according to this example includes a dome cover 11 and a camera unit 14 that is covered by the dome cover 11. The camera unit 14 includes an optical system 15 that is provided on a rear surface side of the dome cover 11 and an imaging element 16 that outputs image data on the basis of imaging light received through the dome cover 11 and the optical system 15.

The camera apparatus 10 further includes a direction driving unit 18 that can drive the camera unit 14 (the optical system 15 and the imaging element 16) to change an imaging direction. Here, the "imaging direction" is aligned with the direction of the optical axis of the optical system 15. The direction driving unit 18 changes the direction of the optical system 15 to change the direction (imaging direction) of the optical axis. In this example, the direction driving unit 18 includes pan and tilt mechanisms. A pan mechanism 19 that can drive the camera unit 14 (the optical system 15 and the imaging element 16) in a pan direction and a tilt mechanism 20 that can drive the camera unit 14 (the optical system 15 and the imaging element 16) in a tilt direction are provided in the dome cover 11.

The dome cover 11 having the camera unit 14 (the optical system 15 and the imaging element 16) and the direction driving unit 18 (the pan mechanism 19 and the tilt mechanism 20) provided on the rear surface side includes a curved portion 12 and a planar portion 13 that is connected to the curved portion 12. Of the front surface and the rear surface of the curved portion 12 of the dome cover 11, at least the rear surface is a curved surface. Of the front surface and the rear surface of the planar portion 13, at least the rear surface is a flat surface. In this example, both the front surface and the rear surface of the curved portion 12 are curved surfaces and both the front surface and the rear surface of the planar portion 13 are flat surfaces. The curved portion 12 and the planar portion 13 have a substantially constant thickness. Typically, the curved portion 12 has a spherical shape and the planar portion 13 has a cylindrical shape. However, the curved portion 12 may have an aspherical shape other than the spherical shape and the planar portion 13 may have a planar shape (for example, a tapered shape) other than the cylindrical shape.

The dome cover 11 includes a discontinuous portion 22 in which a change in the curvature of at least the rear surface (in this example, both the front surface and the rear surface) of the front surface and the rear surface is discontinuous. In the dome cover 11 according to this example, the discontinuous portion 22 is formed by a connection portion between the curved portion 12 and the planar portion 13. In the discontinuous portion 22 corresponding to a boundary portion between the curved portion 12 and the planar portion 13, a refractive index and transmittance change more rapidly than those in a peripheral portion. Therefore, a light beam that passes through the boundary portion (discontinuous portion 22) of the dome cover 11 has a non-uniform spatial frequency and non-uniform signal intensity and causes image quality degradation, such as line blur or line streaks, in a captured image. Image blur and image streaks caused by the non-uniform spatial frequency and signal intensity are not limited to the line blur or line streaks caused by the connection portion (discontinuous portion 22) between the curved portion 12 and the planar portion 13 and have arbitrary shapes and arbitrary characteristics on the basis of arbitrary factors such as scratches or contaminants of the dome cover 11. For example, in a case in which a light shielding portion (for example, a neutral density (ND) filter or a color marker) is provided in the "discontinuous portion 22 of the dome cover 11" or "in any portion of the dome cover 11 or the optical system 15", line streaks occur in the captured image due to the light shielding portion.

Figure 2:
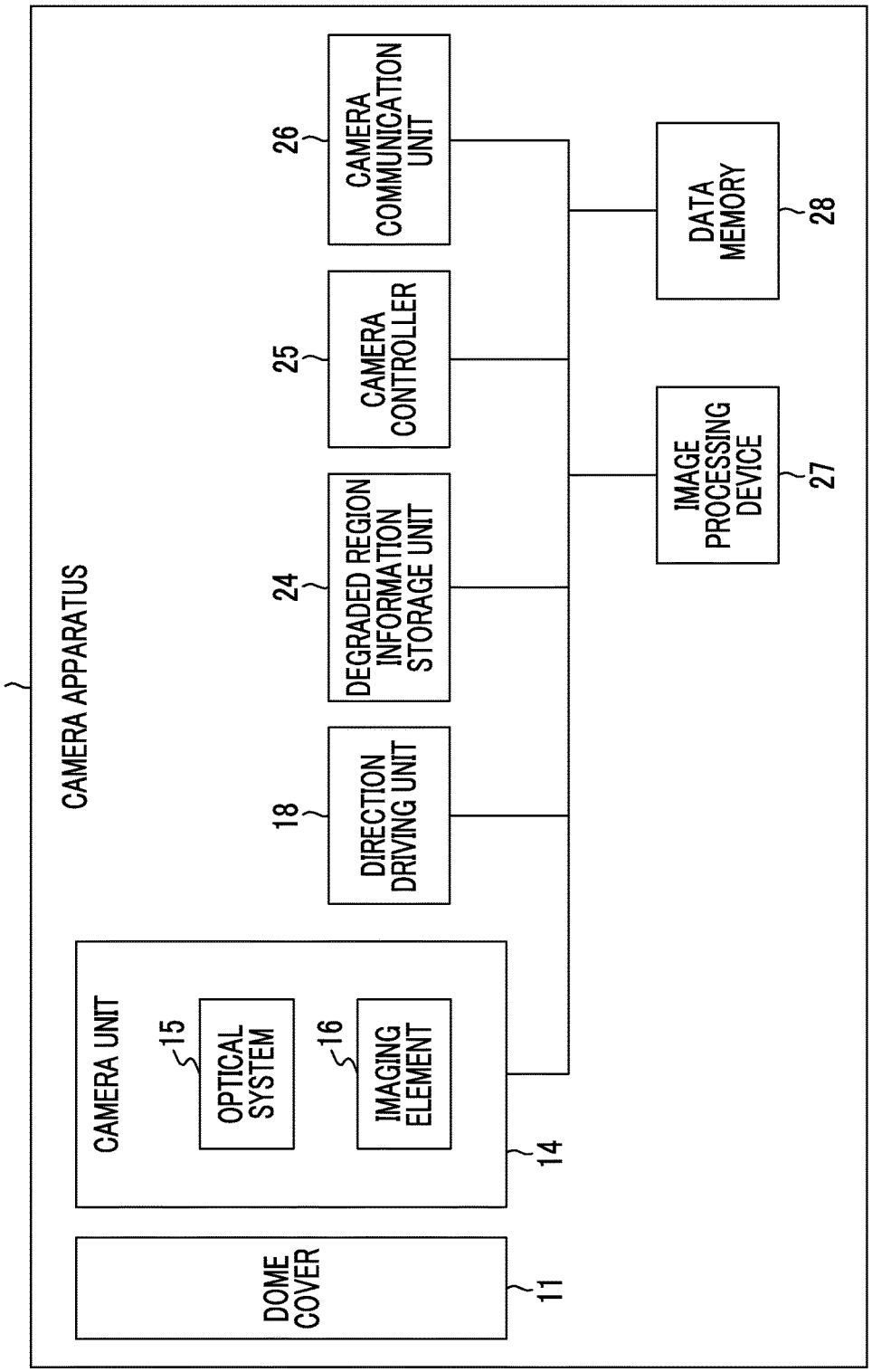
FIG. 2 is a diagram illustrating an example of the functional structure of the camera apparatus.

FIG. 2 is a diagram illustrating an example of the functional structure of the camera apparatus 10.

In this example, the camera apparatus 10 includes a degraded region information storage unit 24, a camera controller 25, a camera communication unit 26, an image processing device 27, and a data memory 28 in addition to the dome cover 11, the camera unit 14 (the optical system 15 and the imaging element 16), and the direction driving unit 18 (the pan mechanism 19 and the tilt mechanism 20). The camera unit 14 (the optical system 15 and the imaging element 16), the direction driving unit 18 (the pan mechanism 19 and the tilt mechanism 20), the degraded region information storage unit 24, the camera controller 25, the camera communication unit 26, the image processing device 27, and the data memory 28 are connected to each other.

The degraded region information storage unit 24 stores degraded region information for each direction in which degraded region data indicating a peculiar degraded region in image data is associated with the imaging direction. The peculiar degraded region is a region associated with a degradation element, which is caused by at least one of the dome cover 11 or the optical system 15 and is based on at least one of a spatial frequency or signal intensity, in image data. The degradation element is typically at least one of image blur or image streaks. The degradation element is caused by the refractive index or transmittance of at least one of the dome cover 11 or the optical system 15. For example, the degradation element is caused by various factors, such as the discontinuous portion 22 and the light shielding portion of the dome cover 11 or scratches and contaminants of the dome cover 11 or the optical system 15. Therefore, the peculiar degraded region includes, for example, a region of the image data which is associated with the degradation element caused by the discontinuous portion 22 or the light shielding portion of the dome cover 11. Hereinafter, an example in which the degradation element is caused by the discontinuous portion 22 of the dome cover 11 will be described. In addition, the degraded region information for each direction stored in the degraded region information storage unit 24 will be described below.

The camera communication unit 26 communicates with an external apparatus to transmit and receive data. The data memory 28 stores various kinds of data, such as image data output from the imaging element 16, and provides the stored data to other devices or stores new data if necessary.

The camera controller 25 controls the overall operation of the camera unit 14 (the optical system 15 and the imaging element 16), the direction driving unit 18, the degraded region information storage unit 24, the camera communication unit 26, the image processing device 27, and the data memory 28. For example, the camera controller 25 controls the imaging element 16 such that imaging is performed, controls the direction driving unit 18 such that the imaging direction is adjusted, controls the image processing device 27 such that image processing is performed for image data, controls the degraded region information storage unit 24 and the data memory 28 such that data is read and written, or controls the camera communication unit 26 such that communication with an external apparatus is performed.

The image processing device 27 performs image processing for image data. The image processing in the image processing device 27 is not particularly limited. In this example, a process of improving the image quality of image data is performed on the basis of the peculiar degraded region.

Figure 3:
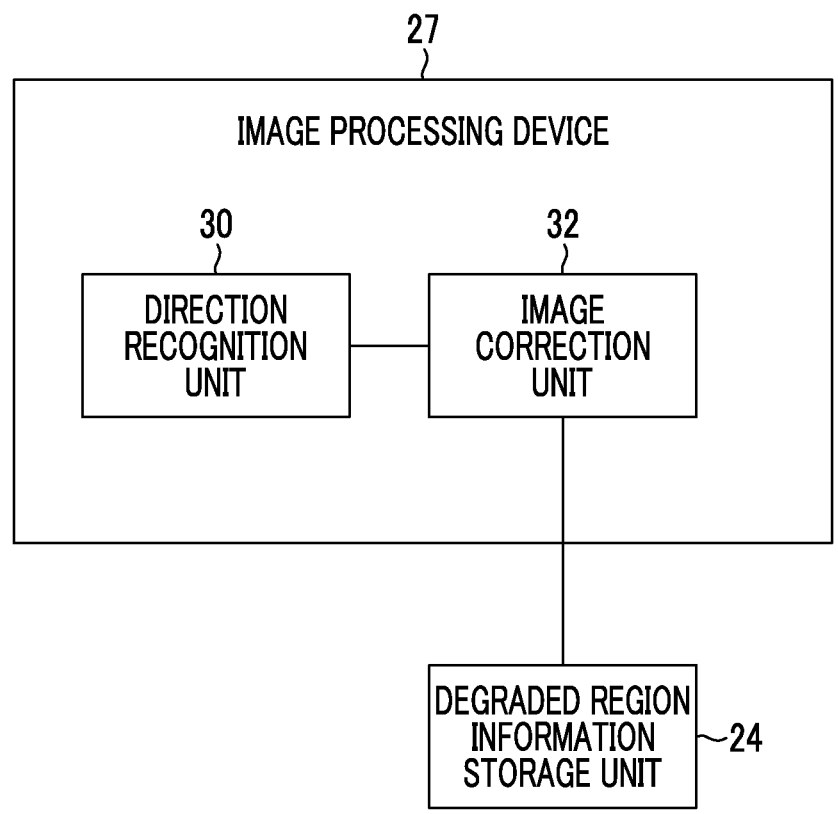
FIG. 3 is a block diagram illustrating an example of the functional structure of an image processing device.

FIG. 3 is a block diagram illustrating an example of the functional structure of the image processing device 27. In this example, the image processing device 27 includes a direction recognition unit 30 and an image correction unit 32.

The direction recognition unit 30 recognizes the imaging direction of the image data to be processed and transmits data indicating the recognized imaging direction to the image correction unit 32. A method for recognizing the imaging direction in the direction recognition unit 30 is not particularly limited. For example, the direction recognition unit 30 may recognize the imaging direction on the basis of data provided from the direction driving unit 18 that adjusts the imaging direction or the camera controller 25 that controls the direction driving unit 18 or may recognize the imaging direction on the basis of meta data added to the image data.

The image correction unit 32 acquires the degraded region information for each direction from the degraded region information storage unit 24. Then, the image correction unit 32 acquires the degraded region data associated with the imaging direction recognized by the direction recognition unit 30, on the basis of the degraded region information for each direction, and performs the image quality improvement process for the image data on the basis of the peculiar degraded region indicated by the degraded region data.

The detailed content of the image quality improvement process is not particularly limited. The image correction unit 32 can perform an arbitrary process corresponding to the degradation characteristics of the peculiar degraded region as the image quality improvement process. Typically, the image quality improvement process includes at least one of a deconvolution process, an unsharp masking process, or a gain adjustment process. The deconvolution process applies an image recovery filter based on a point spread function (PSF) or an optical transfer function (OTF) to image data to improve image quality. The unsharp masking process applies a sharpening filter to image data to perform edge (high-frequency component) enhancement, thereby improving image quality. The gain adjustment process applies gains such that the gain applied to a portion of the image data is different from the gain applied to another portion of the image data. Therefore, for example, in a case in which the degradation characteristics of the peculiar degraded region are based on degradation caused by a spatial frequency, it is preferable that a spatial frequency correction process, such as the deconvolution process or the unsharp masking process, is performed as the image quality improvement process. In contrast, in a case in which the degradation characteristics of the peculiar degraded region are based on degradation caused by signal intensity, it is preferable that a signal intensity correction process, such as the gain adjustment process, is performed as the image quality improvement process.

As such, the image correction unit 32 according to this example performs the image quality improvement process for reducing the influence of image blur and/or image streaks caused by the degradation element based on a spatial frequency and/or signal intensity. In a case in which a real-space filter including a plurality of taps is used in the spatial frequency correction process performed as the image quality improvement process, only the data of local pixels corresponding to the plurality of taps in the real-space filter is used in the spatial frequency correction process. In the signal intensity correction process performed as the image quality improvement process, only the data of the pixel to be processed is used. As such, in the image quality improvement process according to this example which is performed by the image correction unit 32, the amount of necessary data used is less than that in a geometric correction process (for example, a distortion correction process) using the data of pixels at the position which are relatively far away from each other in image data. Therefore, it is possible to rapidly and easily reduce the influence of degradation elements such as image blur and image streaks.

Next, the "degraded region information for each direction" in which the degraded region data indicating the peculiar degraded region in the image data is associated with the imaging direction will be described.

Figure 4:
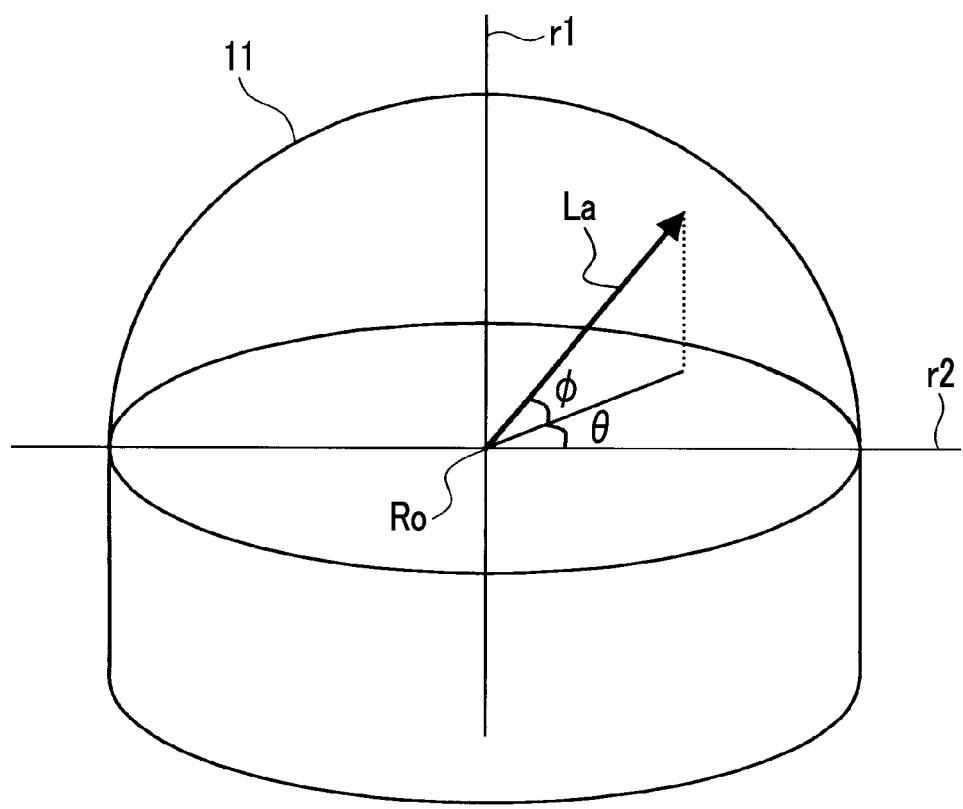
FIG. 4 is a conceptual diagram illustrating the outward appearance of a dome cover and is a diagram illustrating the relationship between the position of an optical axis of a camera unit on the dome cover and a polar coordinate system.

FIG. 4 is a conceptual diagram illustrating the outward appearance of the dome cover 11 and is a diagram illustrating the relationship between the position of the optical axis La of the camera unit 14 on the dome cover 11 and a polar coordinate system.

In this example, the position of an intersection point between an apex vertical line r1 and a horizontal reference line r2 of the dome cover 11 is aligned with the center (hereinafter, also referred to as a "pan/tilt center") Ro of pan and tilt of the camera unit 14 by the direction driving unit 18. It is preferable that the front principle point of the optical system 15 of the camera unit 14 is aligned with the pan/tilt center Ro in order to stabilize a change in the pan and tilt angles. The apex vertical line r1 extends in the vertical direction through the apex of the dome cover 11 (particularly, the curved portion 12). The horizontal reference line r2 extends in the diametrical direction of an opening portion of the dome cover 11 in the horizontal plane which is a reference plane with respect to the pan of the camera unit 14. The horizontal plane which is the reference plane with respect to the pan of the camera unit 14 may or may not be aligned with a plane including the boundary portion (discontinuous portion 22) between the curved portion 12 and the planar portion 13 of the dome cover 11.

In a case in which the pan/tilt center Ro is used as the origin, the direction of the optical axis La from the origin to an arbitrary point on the front surface of the dome cover 11 can be represented by a "pan direction angle (hereinafter, also referred to as a "pan angle") θ with respect to the horizontal reference line r2" and a "tilt direction angle (hereinafter, also referred to as a "tilt angle") φ with respect to a horizontal plane (a plane perpendicular to the apex vertical line r1) which is a reference plane with respect to the pan of the camera unit 14". Therefore, the direction of the optical axis La represented by a "pan angle θ=0°" and a "tilt angle φ=0°" extends along the horizontal reference line r2 illustrated in FIG. 4. In the example illustrated in FIG. 4, the pan angle θ is in the range of "0° to 360°" and the tilt angle φ is in the range of "−90° to 90°". In addition, "0°<the tilt angle φ≤90°" indicates the range of the apex of the dome cover 11 (the range of an upper part of the dome cover 11 illustrated in FIG. 4) and "−90°≤the tilt angle φ<0°" indicates the range of a portion that is closer to the base (planar portion 13) of the dome cover 11 than to the horizontal plane which is a reference plane with respect to the pan operation (the range of a lower part of the dome cover 11 illustrated in FIG. 4).

Figure 5:
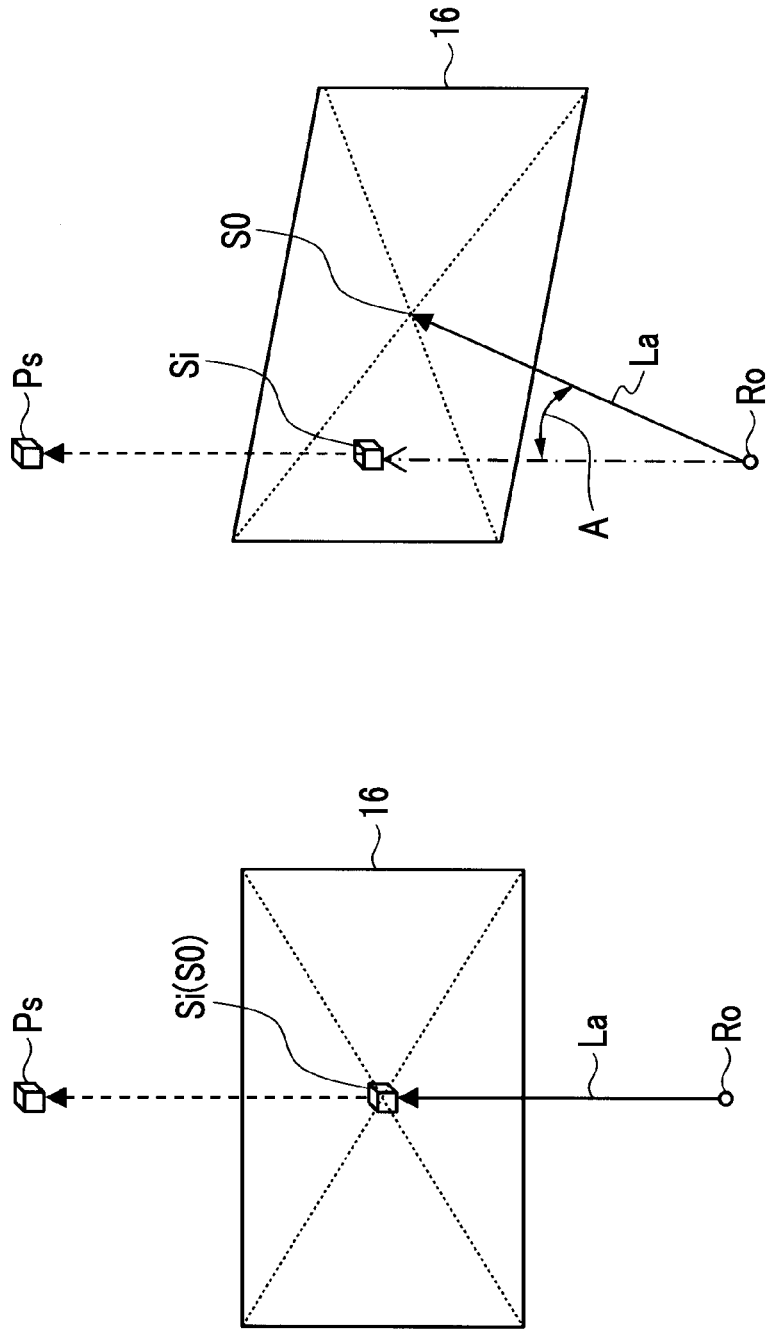
FIGS. 5A and 5B are diagrams illustrating the relationship between the direction of the optical axis of the camera unit and the position of an object on an imaging surface.

FIGS. 5A and 5B are diagrams illustrating the relationship between the direction of the optical axis La of the camera unit 14 and the position of an object on the imaging surface of the imaging element 16. FIG. 5A illustrates an example in which a specific object Ps is disposed on the optical axis La and FIG. 5B illustrates an example in which the specific object Ps is not disposed on the optical axis La. For convenience of description, a case in which the front principle point of the optical system 15 of the camera unit 14 is aligned with the pan/tilt center Ro and the optical system 15 has no distortion (lens distortion) will be described below.

In a case in which the specific object Ps is disposed on the optical axis La as illustrated in FIG. 5A, an image of the specific object Ps is formed at the center of the imaging surface of the imaging element 16 (an intersection point between diagonal lines (see reference numeral "S0" in FIG. 5A)). In contrast, when the camera unit 14 is panned and tilted to shift the imaging direction (the direction of the optical axis La) by "(a pan angle θ, a tilt angle φ)=($θ_A$, $φ_A$) (see letter "A" in FIG. 5B)", the position of the image of the specific object Ps on the imaging surface (see letters "Si" in FIG. 5B) is shifted from the center S0 of the imaging surface by "($-θ_A$, $-φ_A$)" in the pan direction and the tilt direction. When the pan angle θ and the tilt angle φ are known, the use of this relationship makes it possible to specify the position of the specific object Ps on the actual image from the image captured at an arbitrary pan angle θ and an arbitrary tilt angle φ.

Figure 6:
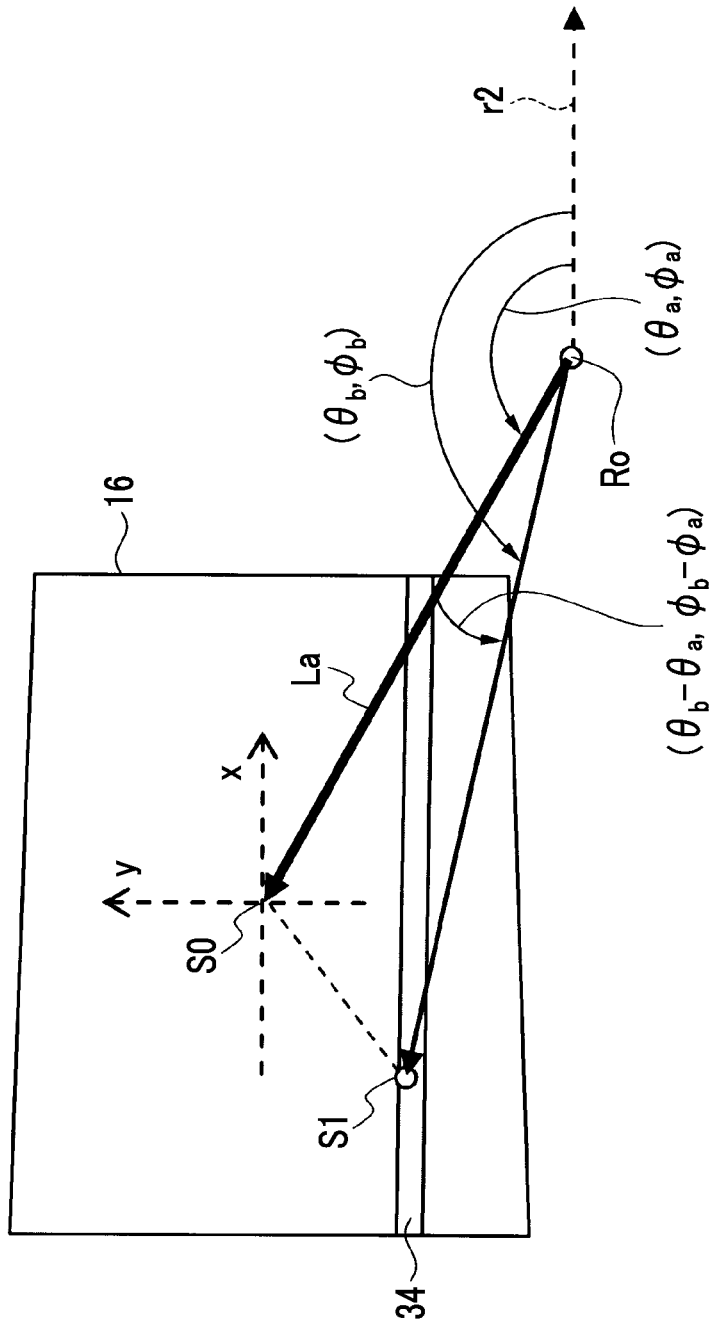
FIG. 6 is a diagram illustrating the relationship between representation in a rectangular coordinate system based on the center of the imaging surface and representation in a polar coordinate system based on a pan/tilt center.

FIG. 6 is a diagram illustrating the relationship between representation in a rectangular coordinate system based on the center S0 of the imaging surface and representation in a polar coordinate system based on the pan/tilt center Ro.

The use of the relationship between the above-mentioned angular displacements described with reference to FIGS. 5A and 5B makes it possible to represent an arbitrary position (see a "first imaging surface position S1" in FIG. 6) on the image surface of the imaging element 16 with the polar coordinate system based on the pan angle θ and the tilt angle φ of the camera unit 14 with respect to the pan/tilt center Ro. In the example illustrated in FIG. 6, in a case in which the center S0 of the imaging surface is expressed by polar coordinate system representation "(the pan angle θ, the tilt angle φ)=($θ_a$, $φ_a$)" and the first imaging surface position S1 is expressed by polar coordinate system representation "(the pan angle θ, the tilt angle φ)=($θ_b$, $φ_b$)", the first imaging surface position S1 relative to the center S0 of the imaging surface is expressed by polar coordinate system representation "(the pan angle θ, the tilt angle φ)=($θ_b-θ_a$, $φ_b-φ_a$)". In addition, the first imaging surface position S1 relative to the center S0 of the imaging surface may be expressed by rectangular coordinate system representation (see the "x" axis and the "y" axis in FIG. 6) based on the center S0 of the imaging surface. Therefore, polar coordinate system representation and rectangular coordinate system representation related to an arbitrary position on the imaging surface can be associated with each other.

The position of a peculiar degradation correspondence portion 34, which is a portion of the imaging surface in which an image is formed by light passing through a portion of the dome cover 11 and/or the optical system 15 (in this example, the discontinuous portion 22 of the dome cover 11) causing a degradation element in image data, varies depending on the pan angle θ and the tilt angle φ of the camera unit 14. Therefore, the position of the peculiar degradation correspondence portion 34 is associated with the imaging direction (the direction of the optical axis La) represented by the pan angle θ and the tilt angle φ of the camera unit 14 and can be represented by the rectangular coordinate system.

Figure 7:
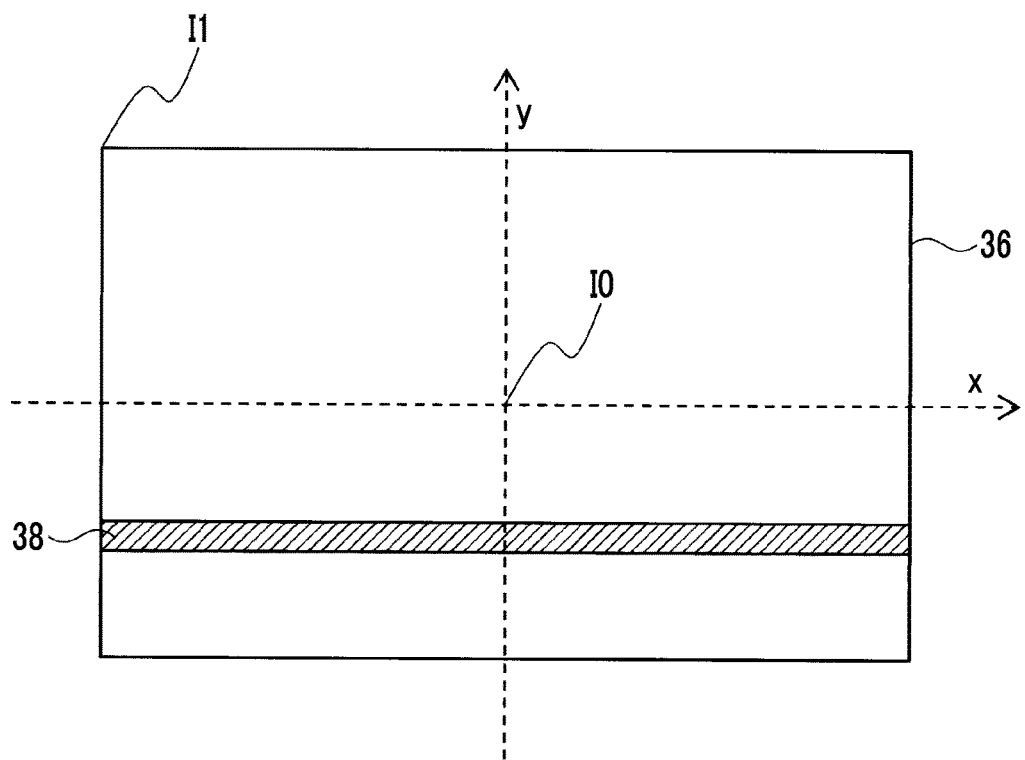
FIG. 7 is a diagram illustrating an example of a peculiar degraded region in a captured image.

FIG. 7 is a diagram illustrating an example of a peculiar degraded region 38 in image data 36. The position of the peculiar degradation correspondence portion 34 (see FIG. 6) in the imaging element 16 (imaging surface) corresponds to the position of the peculiar degraded region 38 in the image data 36 (captured image). That is, the coordinate representation of the peculiar degradation correspondence portion 34 with respect to the center S0 of the imaging surface is basically the same as the coordinate representation of the peculiar degraded region 38 with respect to an image center I0 of the image data 36.

In this example, the degraded region information storage unit 24 (see FIGS. 2 and 3) stores the degraded region information for each direction in which "degraded region data" indicating the position of the peculiar degraded region 38 in the image data 36 is associated with "imaging direction data" indicating the imaging direction.

Figure 8:
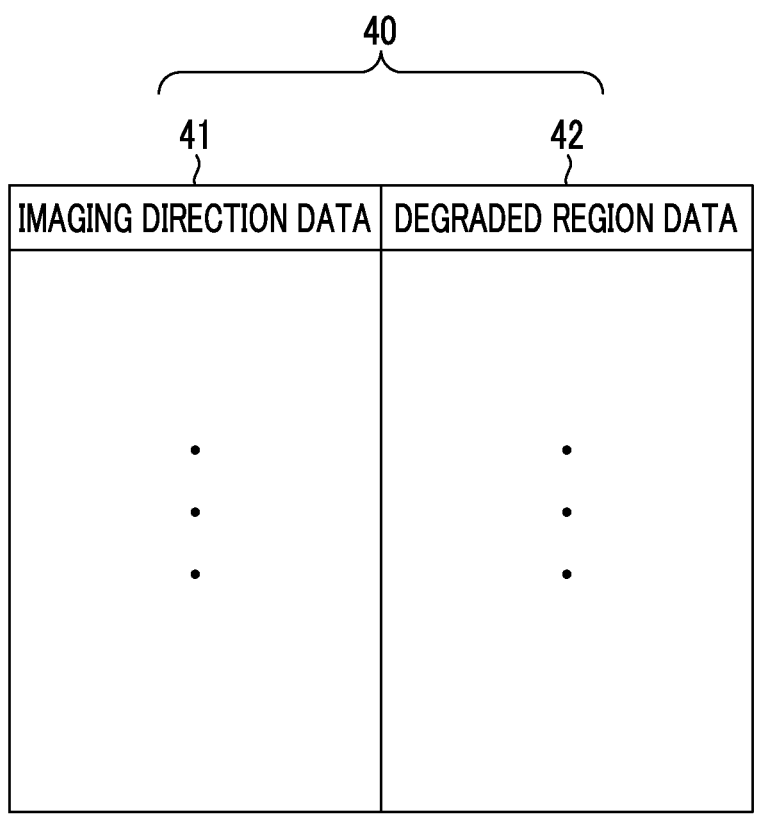
FIG. 8 is a conceptual diagram illustrating an example of degraded region information for each direction.

FIG. 8 is a conceptual diagram illustrating an example of degraded region information 40 for each direction. The degraded region information 40 for each direction includes imaging direction data 41 and degraded region data 42. In the degraded region information 40 for each direction, the position of the peculiar degraded region 38 in the image data is associated with each of a plurality of imaging directions corresponding to pan and tilt. As described above, the imaging direction data 41 is preferably represented by the pan angle θ and the tilt angle φ with respect to the horizontal reference line r2 and the degraded region data 42 is preferably represented by the position of a corresponding pixel in the image data (the position in the rectangular coordinate system). A reference position in a case in which the degraded region data 42 is expressed by rectangular coordinate system representation is not particularly limited. For example, the image center I0 illustrated in FIG. 7 may be represented by a coordinate position "(0, 0)" and the position of the upper left corner of the image data (see reference numeral "I1" indicating the upper left position of the image data in FIG. 7) may be represented by a coordinate position "(0, 0)".

FIG. 9 is a conceptual diagram illustrating a detailed example of the degraded region information 40 for each direction. In the detailed example illustrated in FIG. 9, the position of the pixels forming a corresponding peculiar degraded region 38 is represented by the pan angle θ (0° to 359°) and the tilt angle φ (0° to 90°) at an angular interval of 1° in the rectangular coordinate system. In the example illustrated in FIG. 9, the pixel position of the peculiar degraded region 38 in image data with an image size of 640 by 480 pixels in the x-axis direction and the y-axis direction is illustrated and the position of the upper left corner of the image data (see reference numeral "I1" indicating the upper left position of the image data in FIG. 7) is represented by a coordinate position "(0, 0)". As illustrated in FIG. 9, in the degraded region information 40 for each direction, the degraded region data 42 indicating the position of the peculiar degraded region 38 may be represented by coordinate data indicating the position of each pixel in a pixel group forming the peculiar degraded region 38 in the image data. In this case, the degraded region information storage unit 24 stores aggregated data of the pixel position of the peculiar degraded region 38 which is associated with each combination of the pan angle θ and the tilt angle φ as the degraded region information 40 for each direction.

In the degraded region information 40 for each direction illustrated in FIG. 9, the degraded region data is represented by the coordinate data. However, the degraded region data may be represented by other methods. For example, the degraded region data may be a function data indicating the peculiar degraded region in the image data. For example, the degraded region data may be represented by expressing the boundary of the peculiar degraded region 38 in the image data with, for example, a function and an inequality. The representation of the degraded region data by the function data makes it possible to reduce a memory size required for the degraded region information 40 for each direction in the degraded region information storage unit 24 and to perform a process of reading and acquiring the degraded region data at a high speed.

Next, an example of a method for acquiring the degraded region information 40 for each direction stored in the degraded region information storage unit 24 will be described.

Figure 10:
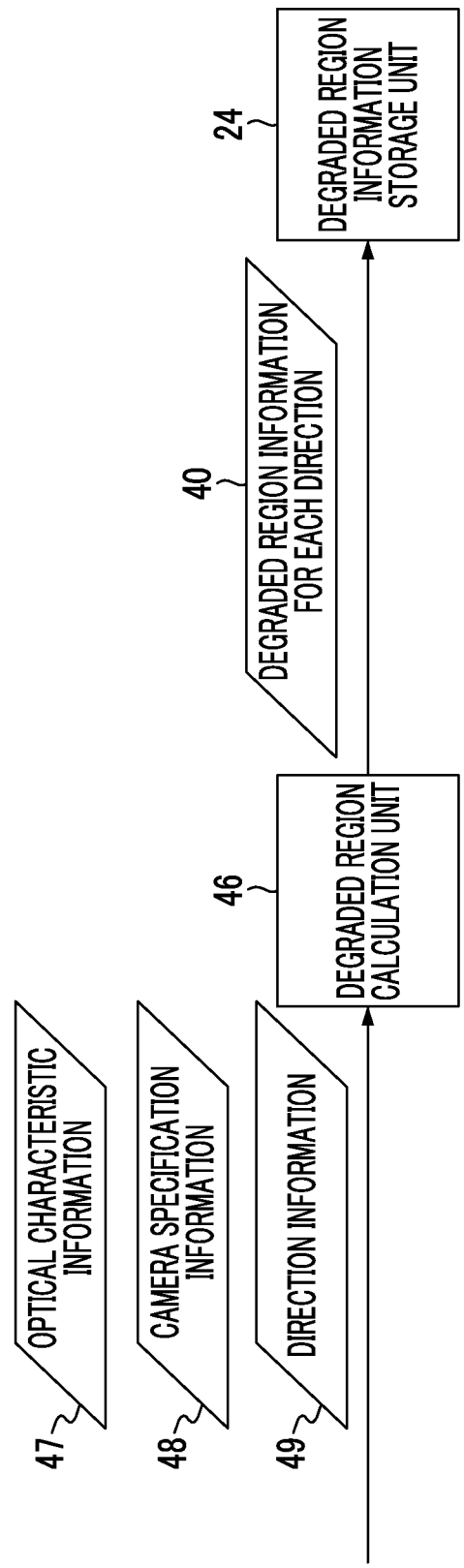
FIG. 10 is a block diagram illustrating an example of a method for acquiring the degraded region information for each direction.

FIG. 10 is a block diagram illustrating an example of the method for acquiring the degraded region information 40 for each direction.

In this example, a degraded region calculation unit 46 performs an operation to calculate the degraded region information 40 for each direction according to optical characteristic information 47, camera specification information 48, and direction information 49 and the degraded region information storage unit 24 stores the calculated degraded region information 40 for each direction. In the example illustrated in FIG. 2, the degraded region information storage unit 24 is provided as a portion of the camera apparatus 10. The degraded region calculation unit 46 may be provided as a portion of the camera apparatus 10 or may be a device that is provided separately from the camera apparatus 10.

The optical characteristic information 47 indicates the optical characteristics of at least one of the dome cover 11 or the optical system 15. In particular, the optical characteristic information 47 includes information about a factor (in this example, the discontinuous portion 22 of the dome cover 11) that causes the peculiar degraded region 38 (degradation element). Specifically, the optical characteristic information 47 includes information indicating the position of the factor (in this example, the discontinuous portion 22 of the dome cover 11) that causes the peculiar degraded region 38 (degradation element). The camera specification information 48 indicates the characteristics (conditions) of the camera unit 14 and includes various kinds of information, such as the optical characteristics (for example, the focal length) of the optical system 15, the pixel characteristics of the imaging element 16, and the size information of the optical system 15 and the imaging element 16. The direction information 49 indicates the range of the imaging direction that can be changed by the direction driving unit 18 (the pan mechanism 19 and the tilt mechanism 20) and is represented by the pan angle θ and the tilt angle φ with respect to the pan/tilt center Ro as described above.

The degraded region calculation unit 46 specifies the coordinate position of the peculiar degraded region 38 on the basis of the optical characteristic information 47, the camera specification information 48, and the direction information 49. For example, the degraded region calculation unit 46 can specify the coordinate position (absolute position) of the peculiar degraded region 38 using the polar coordinate system in a real space having the pan/tilt center Ro as the center of the polar coordinate system center. In this case, the degraded region calculation unit 46 can calculate the coordinate position (relative position) of the peculiar degraded region 38 in the image data in each imaging direction (the pan angle θ and the tilt angle φ) from the coordinate position (absolute position) of the peculiar degraded region 38, using the above-mentioned relationship between the angular displacements (see FIGS. 5 to 7).

For example, in a case in which the coordinate position (absolute position) of the pixel (constituent pixel) forming the peculiar degraded region 38 is expressed by polar coordinate system representation "$(\theta_c, \phi_c)$" based on the pan/tilt center Ro and the horizontal reference line r2 (see FIG. 6), when the camera unit 14 is panned and tilted by "(pan angle, tilt angle)=$(\theta_d, \phi_d)$", the coordinate position (relative position) of the constituent pixel in the image data is represented by a coordinate position "(x, y)" (rectangular coordinate system) calculated by the following expression.

$$x = f \tan(\theta_c - \theta_d)$$

$$y = f \tan(\phi_c - \phi_d)$$

In the expression, "f" indicates the focal length of the optical system 15.

Figure 11:
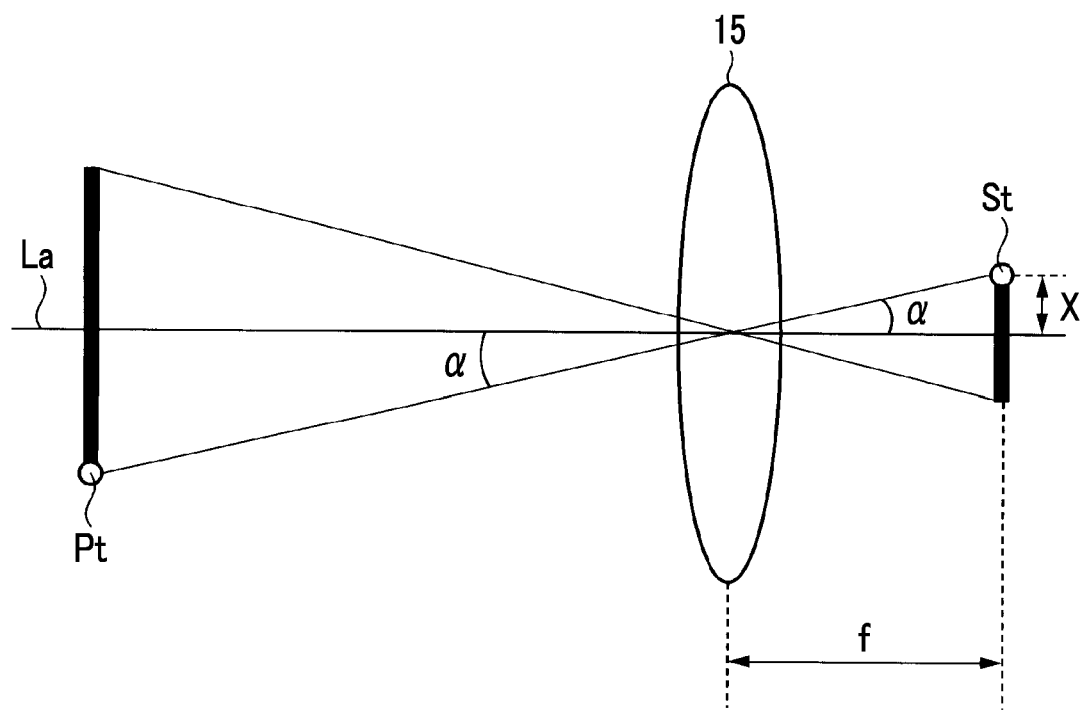
FIG. 11 is a diagram illustrating the relationship between the focal length of an optical system and the position of an image (image height).

FIG. 11 is a diagram illustrating the relationship between the focal length f of the optical system 15 and the position of an image (image height X). In general, the distance (see the "image height X" in FIG. 11) of the image formation position (see a "specific object point image St" in FIG. 11) of a specific object point Pt on the imaging surface from the optical axis La is represented by the following expression on the basis of the focal length f of the optical system 15 and the position angle α of the specific object point Pt.

$$X = f \tan \alpha$$

It is possible to derive an expression for calculating the coordinate position "(x, y)" (rectangular coordinate system) of the pixel forming the peculiar degraded region 38 on the basis of the expression for calculating the image height X.

Then, the degraded region information storage unit 24 illustrated in FIG. 10 stores "the degraded region information 40 for each direction specified on the basis of the peculiar degraded region 38 determined on the basis of the optical characteristic information 47, the camera specification information 48, and the direction information 49" calculated by the degraded region calculation unit 46.

Figure 12:
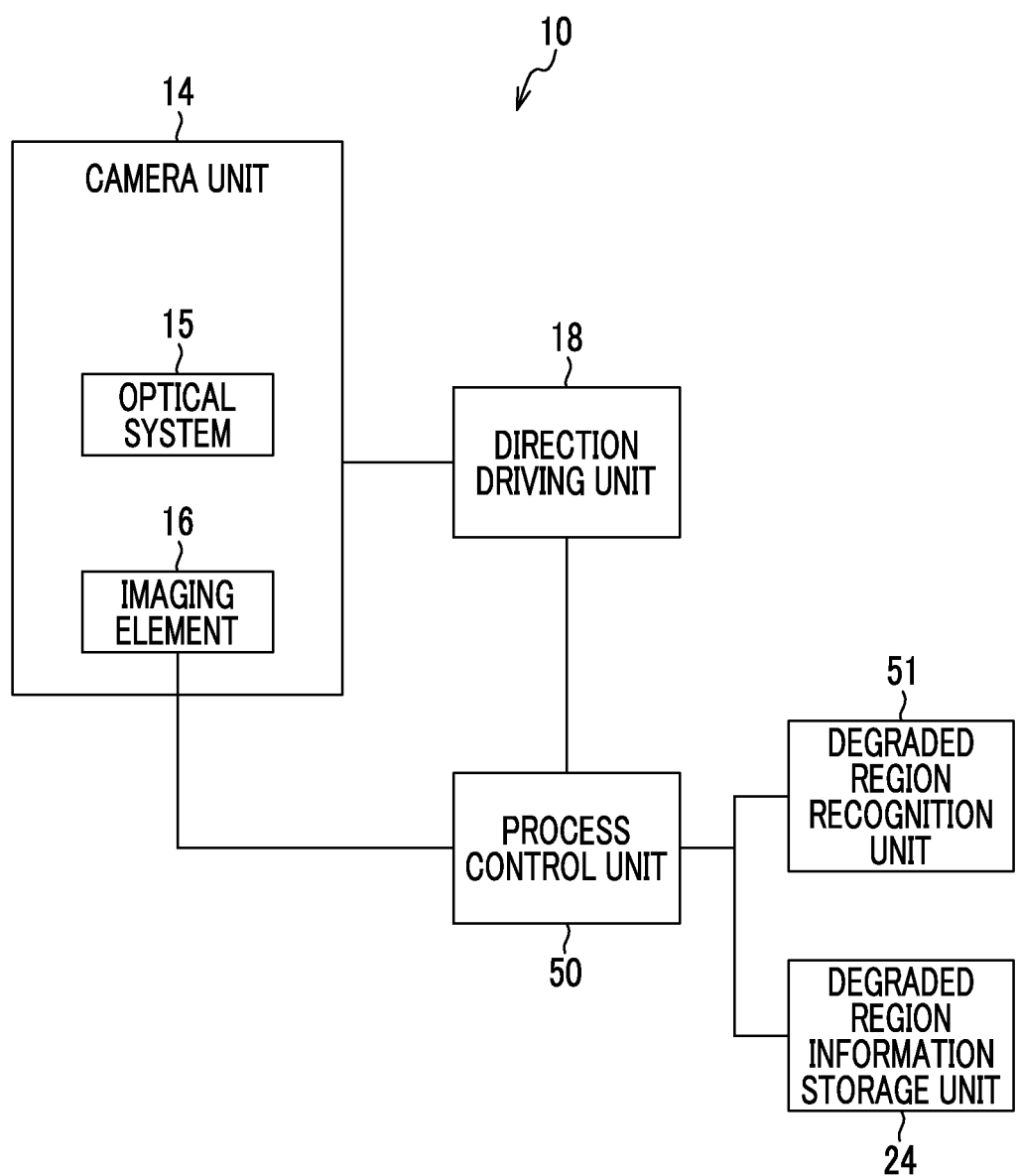
FIG. 12 is a diagram illustrating another example of the method for acquiring the degraded region information for each direction and is a block diagram illustrating an example of the functional structure of the camera apparatus.

FIG. 12 is a diagram illustrating another example of the method for acquiring the degraded region information 40 for each direction and is a block diagram illustrating an example of the functional structure of the camera apparatus 10. The camera apparatus 10 according to this example includes a process control unit 50 that is connected to the imaging element 16, the direction driving unit 18, and the degraded region information storage unit 24 and a degraded region recognition unit 51 that is connected to the process control unit 50. Means for implementing the process control unit 50 and the degraded region recognition unit 51 is not particularly limited. For example, the camera controller 25 or the image processing device 27 may function as the process control unit 50 and the degraded region recognition unit 51.

The degraded region recognition unit 51 analyzes image data to specify a peculiar degraded region. The process control unit 50 controls at least the imaging element 16, the direction driving unit 18, the degraded region recognition unit 51, and the degraded region information storage unit 24 such that the degraded region information 40 for each direction is stored in the degraded region information storage unit 24. That is, the process control unit 50 controls the direction driving unit 18 and the imaging element 16 in advance such that image data related to a plurality of imaging directions is output from the imaging element 16, controls the degraded region recognition unit 51 such that the degraded region recognition unit 51 specifies the peculiar degraded region 38 related to each of the plurality of imaging directions, and stores the degraded region information 40 for each direction in which degraded region data indicating the peculiar degraded region 38 specified by the degraded region recognition unit 51 is associated with the imaging directions in the degraded region information storage unit 24.

For example, the process control unit 50 may put a marker (for example, a black line) to the degradation element (in this example, the discontinuous portion 22) of the dome cover 11 causing the peculiar degraded region 38 and perform imaging with an imaging background of a uniform color (for example, while), while changing the imaging direction at a small angular interval using the direction driving unit 18, to acquire image data for each imaging direction. Then, the degraded region recognition unit 51 may perform image processing (for example, a binarization process) for each image data item to specify the position of the pixel forming the peculiar degraded region and store the degraded region information 40 for each direction in the degraded region information storage unit 24.

The process of acquiring the degraded region information 40 for each direction stored in the degraded region information storage unit 24 (see FIGS. 10 to 12) is performed after the dome cover 11 is mounted on the camera unit 14 and before a main imaging operation is performed. For example, the acquisition process can be performed in a process for manufacturing the camera apparatus 10 or the after-sales service.

Next, a detailed example of the image quality improvement process performed by the image correction unit 32 will be described. An example in which the peculiar degraded region 38 is represented as a region indicating a degradation element in image data and the image correction unit 32 performs the image quality improvement process for the peculiar degraded region 38 will be described below.

Figure 13:
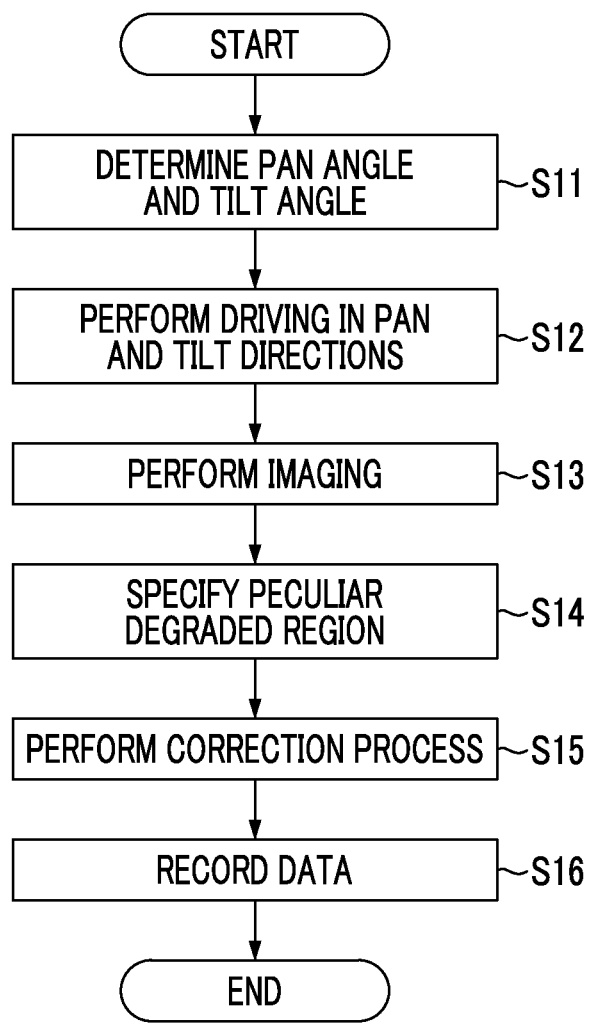
FIG. 13 is a flowchart illustrating an example of an image quality improvement process.

FIG. 13 is a flowchart illustrating an example of the image quality improvement process.

In a case in which imaging is performed by the camera apparatus 10, first, the pan angle θ and the tilt angle φ are decided to determine a desired imaging direction (Step S11 in FIG. 13). The imaging direction can be determined by an arbitrary criterion. For example, the imaging direction may be automatically determined by the camera controller 25 or the user may use an external remote controller to designate the imaging direction through wireless communication with the camera controller 25 (camera communication unit 26).

When the imaging direction is determined, the camera controller 25 controls the direction driving unit 18 such that the camera unit 14 (the optical system 15 and the imaging element 16) is driven in the pan direction and the tilt direction to align the direction of the optical axis with the imaging direction (Step S12).

After the imaging direction is adjusted by the direction driving unit 18, the camera controller 25 controls the imaging element 16 such that imaging is performed and the imaging element 16 outputs image data (Step S13). The image data is transmitted to the image processing device 27.

In the image processing device 27, the direction recognition unit 30 recognizes the imaging direction of the image data and the image correction unit 32 specifies the peculiar degraded region 38 in the image data (Step S14). The peculiar degraded region 38 is specified from the imaging direction of the image data with reference to the degraded region information 40 for each direction stored in the degraded region information storage unit 24 as described above.

Then, the image correction unit 32 corrects the image data to perform the image quality improvement process for the peculiar degraded region 38 (Step S15). The image quality improvement process is not particularly limited. However, it is preferable that the image quality improvement process corresponds to the degradation characteristics of the peculiar degraded region 38. For example, in a case in which the peculiar degraded region 38 causes image blur, the deconvolution process or the unsharp masking process is preferably performed as the image quality improvement process. In a case in which the peculiar degraded region 38 causes image streaks, the gain adjustment process is preferably performed as the image quality improvement process. Processes other than the above-mentioned processes may be performed as the image quality improvement process. For example, a process which copies the data (pixel values) of pixels (pixels that are not included in the peculiar degraded region 38) adjacent to the peculiar degraded region 38 and uses the copied data as the data of the pixels forming the peculiar degraded region 38 may be used as the image quality improvement process.

The image data corrected by the image correction unit 32 is stored in the data memory 28 or is transmitted to an external apparatus through the camera communication unit 26 under the control of the camera controller 25 (Step S16).

In the above-mentioned image processing method, a "step of acquiring the image data output from the imaging element 16 on the basis of the imaging light received through the dome cover 11 and the optical system 15" is performed by Steps S11 to S13. In addition, a "step of recognizing the imaging direction when the image data is acquired" and a "step of acquiring the degraded region data associated with the imaging direction when the image data is acquired on the basis of the degraded region information 40 for each direction in which the degraded region data indicating the peculiar degraded region 38 in the image data is associated with the imaging direction and performing the image quality improvement process for the image data according to the peculiar degraded region 38 indicated by the degraded region data" are performed by Steps S14 and S15.

First Modification Example

In the above-described embodiment, the peculiar degraded region 38 is a region indicating a degradation element of the image data and the image correction unit 32 performs the image quality improvement process for the peculiar degraded region 38. However, the target of the image quality improvement process is not limited thereto.

Figure 14:
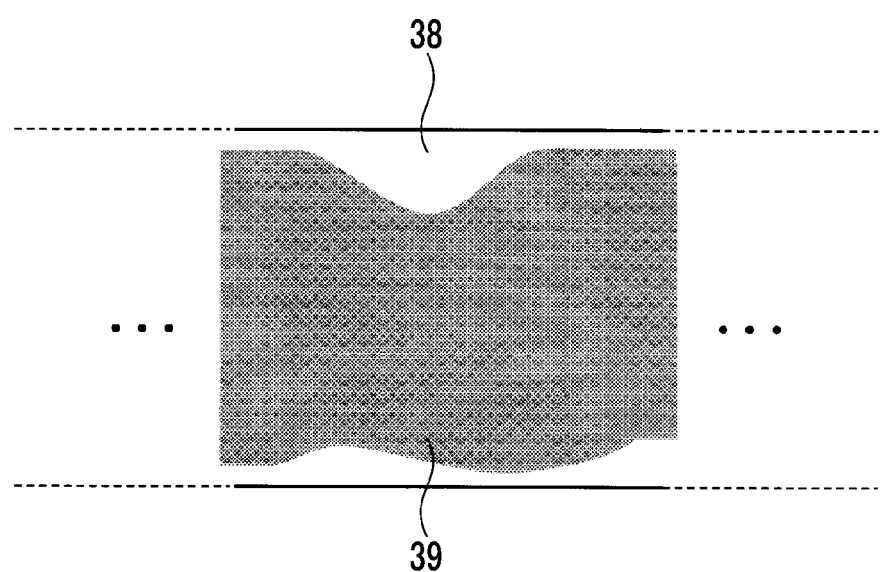
FIG. 14 is a diagram illustrating an image-quality-degraded portion to be subjected to an image quality improvement process according to a first modification example.

FIG. 14 is a diagram illustrating an image-quality-degraded portion 39 which is the target of an image quality improvement process according to a first modification example. In this example, a wide region, which includes a portion indicating a degradation element (hereinafter, referred to as an "image-quality-degraded portion 39"), such as image blur or image streaks, in image data is set as the peculiar degraded region 38. In this case, the image correction unit 32 analyzes the image data to specify the image-quality-degraded portion 39 indicating the degradation element in the peculiar degraded region 38 of the image data and performs the image quality improvement process for the image-quality-degraded portion 39.

A method for specifying the image-quality-degraded portion 39 in the image correction unit 32 is not particularly limited. For example, the image correction unit 32 can perform arbitrary processes, such as an edge detection process and a gradient detection process, for the peculiar degraded region 38 to strictly specify each pixel of the image-quality-degraded portion 39. It is preferable to use an operator corresponding to the degradation characteristics of the image-quality-degraded portion 39 in the process of specifying the image-quality-degraded portion 39. For example, in a case in which there is a brightness difference in the peculiar degraded region 38, the image correction unit 32 can specify the image-quality-degraded portion 39, using an edge detection operator based on a so-called Sobel filter or a so-called Laplacian filter. In a case in which image blur occurs in the image-quality-degraded portion 39, the image correction unit 32 can specify the image-quality-degraded portion 39 on the basis of the distribution of output values from a single bandpass filter or a plurality of bandpass filters.

In a case in which a preset peculiar degraded region 38 strictly corresponds to the degradation element of the image data in terms of pixel accuracy, it is not necessary to specify the image-quality-degraded portion 39 in principle. However, in practice, there are various unexpected factors (for example, errors). For example, the "unexpected factors" include a driving error (errors in the control of the pan angle and the tilt angle) of the direction driving unit 18 (the pan mechanism 19 and the tilt mechanism 20) the distortion of the optical system 15, and the deviation between the pan/tilt center Ro and the position of the front principal point of the optical system 15. When the various unexpected factors are considered, it is preferable that the peculiar degraded region 38 is widely preset and the image-quality-degraded portion 39 is detected and specified from the peculiar degraded region 38 by the detection process. In addition, a region in which the degradation element is expected to be present is detected and set as the peculiar degraded region 38 in the entire region of the image data in advance. In this case, the image correction unit 32 can specify the image-quality-degraded portion 39 at a high speed, without detecting the image-quality-degraded portion 39 from the entire region of the image data. Therefore, it is possible to effectively prevent an error in the detection of the image-quality-degraded portion 39.

The image quality improvement process of the image correction unit 32 is a process for mainly reducing the influence of the degradation element based on a spatial frequency and signal intensity. In the actual process, it is possible to perform the image quality improvement process, using the data of a local pixel group including the pixel to be processed or only the data of the pixel to be processed. As such, in a case in which the correction range of the image quality improvement process is limited, it is possible to effectively use the "process of widely setting the peculiar degraded region 38 and more strictly specifying the image-quality-degraded portion 39 in the peculiar degraded region 38" according to this example.

Figure 15:
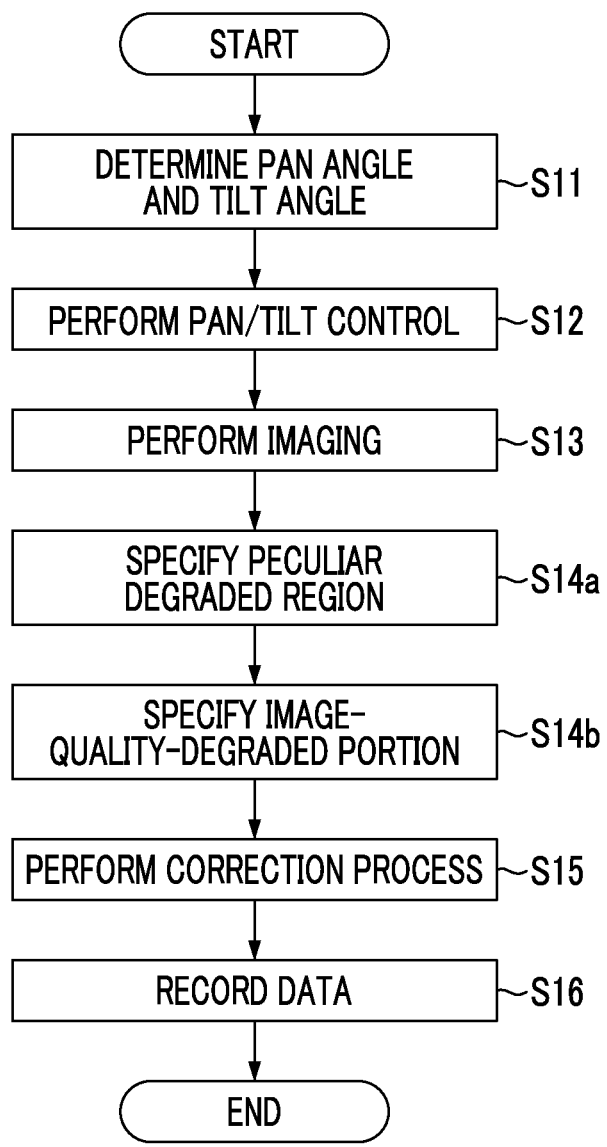
FIG. 15 is a flowchart illustrating an example of the image quality improvement process according to the first modification example.

FIG. 15 is a flowchart illustrating an example of an image quality improvement process according to the first modification example. In this modification example, the same steps as those in the image quality improvement process illustrated in FIG. 13 are denoted by the same reference numerals and the detailed description thereof will not be repeated.

In this example, first, the pan angle θ and the tilt angle φ are decided to determine a desired imaging direction (Step S11 in FIG. 15). The camera unit 14 (the optical system 15 and the imaging element 16) is driven in the pan direction and the tilt direction to align the direction of the optical axis with the imaging direction (Step S12). Then, imaging is performed and the imaging element 16 outputs image data (Step S13).

Then, the direction recognition unit 30 recognizes the imaging direction of the image data and the image correction unit 32 specify the peculiar degraded region 38 of the image data on the basis of the degraded region information 40 for each direction (Step S14a). In this example, the image correction unit 32 analyzes the image data (particularly, the peculiar degraded region 38) to specify the image-quality-degraded portion 39 in the peculiar degraded region 38 (Step S14b).

Then, the image correction unit 32 performs the correction process for the image data and performs the image quality improvement process for the image-quality-degraded portion 39 (Step S15). The corrected image data is stored in the data memory 28 or is transmitted to an external apparatus through the camera communication unit 26 under the control of the camera controller 25 (Step S16).

Second Modification Example

Degraded region information 40 for each direction stored in a degraded region information storage unit 24 according to this modification example includes degradation characteristic data 43 indicating the degradation characteristics of the degraded region data 42 in addition to the imaging direction data 41 and the degraded region data 42.

Figures 16, 17:
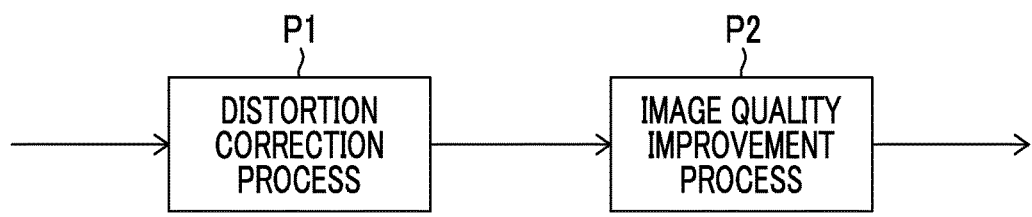
FIG. 16 is a conceptual diagram illustrating an example of degraded region information for each direction according to a second modification example.
FIG. 17 is a block diagram illustrating a correction process performed by an image correction unit (image processing device) according to a third modification example.

FIG. 16 is a conceptual diagram illustrating an example of the degraded region information 40 for each direction according to the second modification example. In this example, the degraded region information 40 for each direction in which the degradation characteristic data 43 indicating the degradation characteristics of the peculiar degraded region 38 related to each of a plurality of imaging directions is associated with the imaging direction data 41 and the degraded region data 42 is stored in the degraded region information storage unit 24. For example, in a case in which image blur and image streaks are considered as the degradation characteristics, the degraded region information 40 for each direction includes imaging direction data 41 and degraded region data 42 which are associated with degradation characteristic data 43 indicating the image blur and imaging direction data 41 and degraded region data 42 which are associated with degradation characteristic data 43 indicating the image streaks. Therefore, in the degraded region information 40 for each direction according to this example, a plurality of degradation characteristic data items 43 and a plurality of degraded region data items 42 indicating different degradation characteristics are associated with imaging direction data 41 indicating the same imaging direction.

As such, since the degraded region data 42 indicating the peculiar degraded region 38 and the degradation characteristic data 43 indicating the degradation characteristics of the peculiar degraded region 38 are recorded in the degraded region information 40 for each direction, the image correction unit 32 can use the degradation characteristic data 43 as parameters in the correction process. That is, in this example, the image correction unit 32 acquires the degraded region data 42 and the degradation characteristic data 43 associated with the imaging direction recognized by the direction recognition unit 30 on the basis of the degraded region information 40 for each direction. Then, the image correction unit 32 performs the image quality improvement process on the basis of the peculiar degraded region 38 indicated by the acquired degraded region data 42 and the degradation characteristics indicated by the acquired degradation characteristic data 43. Therefore, it is possible to perform the image quality improvement process corresponding to the characteristics of a degradation element and to provide image data with high image quality.

A method for acquiring the degraded region information 40 for each direction (see FIG. 16) according to this example is not particularly limited. For example, in a case in which the degraded region information 40 for each direction according to this example is acquired by the camera apparatus 10 illustrated in FIG. 12, the process control unit 50 may direct the degraded region recognition unit 51 to specify the degradation characteristics of the peculiar degraded region 38 related to each of a plurality of imaging directions and store the degraded region information 40 for each direction in which the degradation characteristic data 43 indicating the specified degradation characteristics, the imaging direction data 41, and the degraded region data 42 are associated with each other in the degraded region information storage unit 24.

Third Modification Example

The image processing device 27 (image correction unit 32) performs the image quality improvement process for the peculiar degraded region 38 (image-quality-degraded portion 39) related to the degradation element based on the spatial frequency and signal intensity caused by the dome cover 11. However, the image processing device 27 may perform other correction processes.

FIG. 17 is a block diagram illustrating a correction process performed by an image correction unit 32 (image processing device 27) according to a third modification example.

In this example, the image correction unit 32 performs a distortion correction process P1 of correcting the distortion of the optical system 15 for image data before the above-mentioned image quality improvement process P2. The distortion correction process P1 can be performed on the basis of any method. The image correction unit 32 can acquire data that directly or indirectly indicates the distortion of the optical system 15 from an arbitrary portion (for example, a memory (not illustrated) provided in the optical system 15 or the data memory 28 provided in the camera apparatus 10) and perform the distortion correction process P1 on the basis of the data indicating the distortion.

As such, since the distortion correction process P1 is performed before the image quality improvement process P2, it is possible to improve the accuracy of correction by the image quality improvement process P2 and to effectively reduce the influence of a degradation element in the peculiar degraded region 38.

Fourth Modification Example

In the above-described embodiment, the example in which the imaging element 16 outputting image data and the image processing device 27 performing the image quality improvement process for the image data are provided in the camera apparatus 10 (see FIG. 2) has been described. However, the imaging element 16 and the image processing device 27 may be separately provided.

Figure 18:
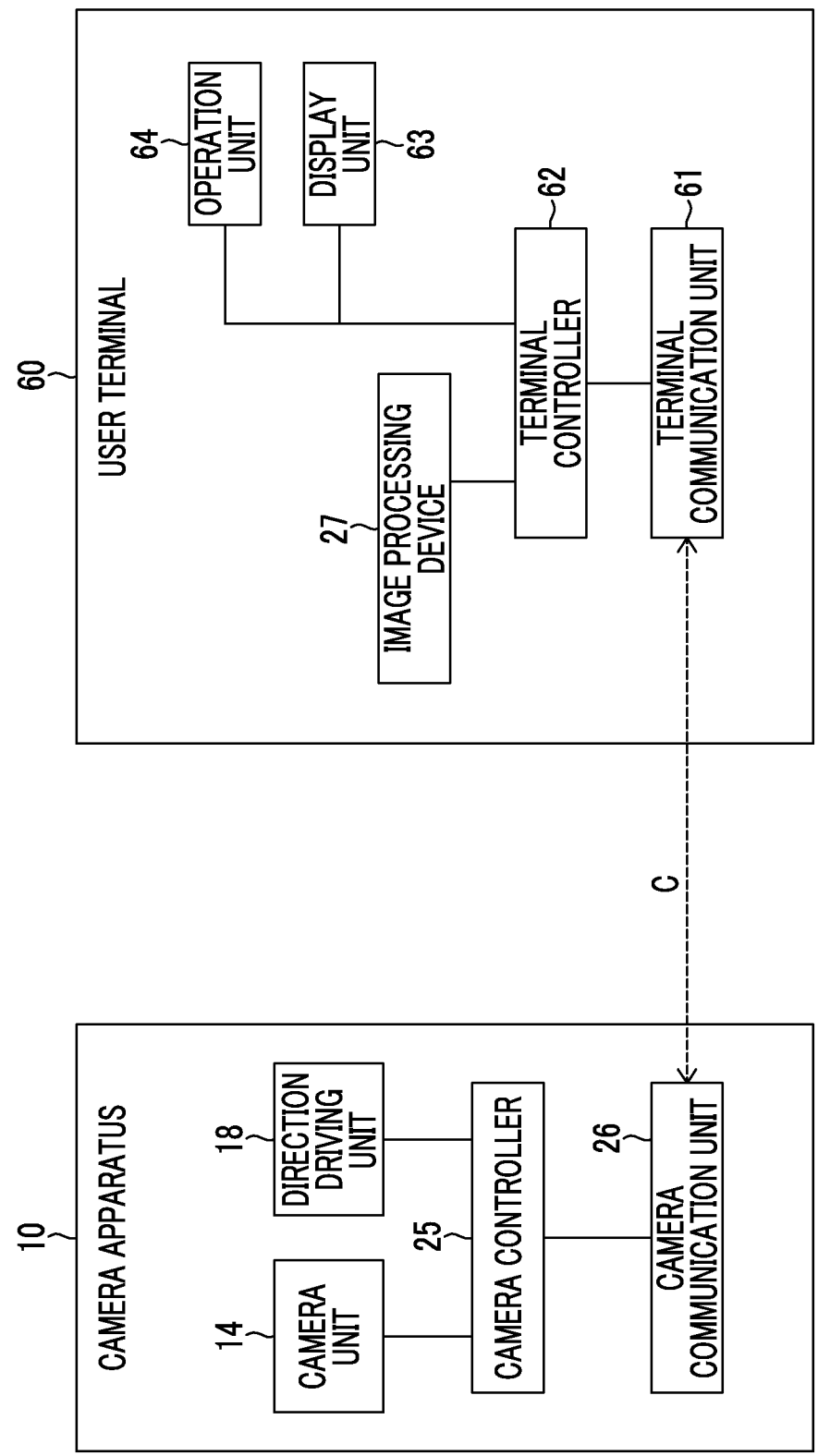
FIG. 18 is a block diagram illustrating an example of an image processing device according to a fourth modification example.

FIG. 18 is a block diagram illustrating an example of an image processing device 27 according to a fourth modification example. In this example, a user terminal 60 that is provided separately from the camera apparatus 10 includes the image processing device 27 (the direction recognition unit 30 and the image correction unit 32).

In this example, a camera apparatus 10 includes the camera unit 14 (the optical system 15 and the imaging element 16), the direction driving unit 18, the camera controller 25, and the camera communication unit 26. Communication C is established between the camera communication unit 26 of the camera apparatus 10 and a terminal communication unit 61 of the user terminal 60 and data communication can be performed between the camera apparatus 10 (camera controller 25) and the user terminal 60 (terminal controller 62). In a case in which imaging is performed, the direction driving unit 18 adjusts the imaging direction and the camera unit 14 performs imaging and outputs image data under the control of the camera controller 25 as in the above-described embodiment.

In this example, the camera controller 25 associates the image data with data (hereinafter, referred to as "imaging direction data") indicating the imaging direction of the image data and transmits the image data to a terminal controller 62 through the camera communication unit 26 and the terminal communication unit 61. For example, the camera controller 25 can preferably transmit image data to which meta data including information about the imaging direction has added to the terminal controller 62.

The user terminal 60 includes the image processing device 27, an operation unit 64, and a display unit 63 which are controlled by the terminal controller 62 in addition to the terminal communication unit 61 and the terminal controller 62.

The image processing device 27 provided in the user terminal 60 performs the image quality improvement process for the image data transmitted from the camera apparatus 10 as in the above-described embodiment. That is, in this example, the image processing device 27 acquires the image data and the imaging direction data from the data transmitted from the camera apparatus 10. Then, the image processing device 27 acquires the degraded region data 42 associated with the imaging direction data on the basis of the degraded region information 40 for each direction in which the imaging direction and the degraded region data 42 indicating the peculiar degraded region 38 in the image data are associated with each other. Then, the image processing device 27 performs the image quality improvement process for the image data on the basis of the peculiar degraded region 38 indicated by the acquired degraded region data 42.

In this example, the degraded region information 40 for each direction may be stored in a memory (not illustrated) provided in the user terminal 60 or a memory device other than the user terminal 60. For example, the degraded region information storage unit 24 may be provided in the user terminal 60 and the image processing device 27 may acquire the degraded region information 40 for each direction from the degraded region information storage unit 24 if necessary. In addition, the degraded region information storage unit 24 may be provided in, for example, the camera apparatus 10 or a server connected to the terminal communication unit 61 and the image processing device 27 may acquire the degraded region information 40 for each direction from the degraded region information storage unit 24 through the terminal controller 62 and the terminal communication unit 61 if necessary.

In a case in which the image processing device 27 is provided in the user terminal 60, the terminal controller 62 may reflect a command that is input by the user through the operation unit 64 in the correction process (image quality improvement process) of the image processing device 27 and display an image based on the image data subjected to the correction process (image quality improvement process) on the display unit 63.

Other Modification Examples

Each of the above-mentioned functional structures can be implemented by arbitrary hardware, arbitrary software, or a combination thereof. For example, the invention can be applied to a program that causes a computer to perform a processing method (image processing method) and a control method (procedure) in each unit of the camera apparatus 10 and the user terminal 60, a computer readable recording medium (non-transitory tangible medium) in which the program is recorded, or a computer in which the program can be installed.

In the above-mentioned example, the "degradation element caused by the discontinuous portion 22 of the dome cover 11" has been mainly described. However, the invention is effective in reducing the influence of other degradation elements. That is, the influence of the "degradation element which is caused by at least one of the dome cover 11 or the optical system 15 and is based on at least one of a spatial frequency or signal intensity" can be reduced by the image quality improvement process.

The form of the user terminal 60 is not particularly limited. For example, a mobile phone, a smart phone, a personal digital assistant (PDA), and a portable game machine may be used as the user terminal 60. Next, an example of the smart phone will be described.

<Structure of Smart Phone>

Figure 19:
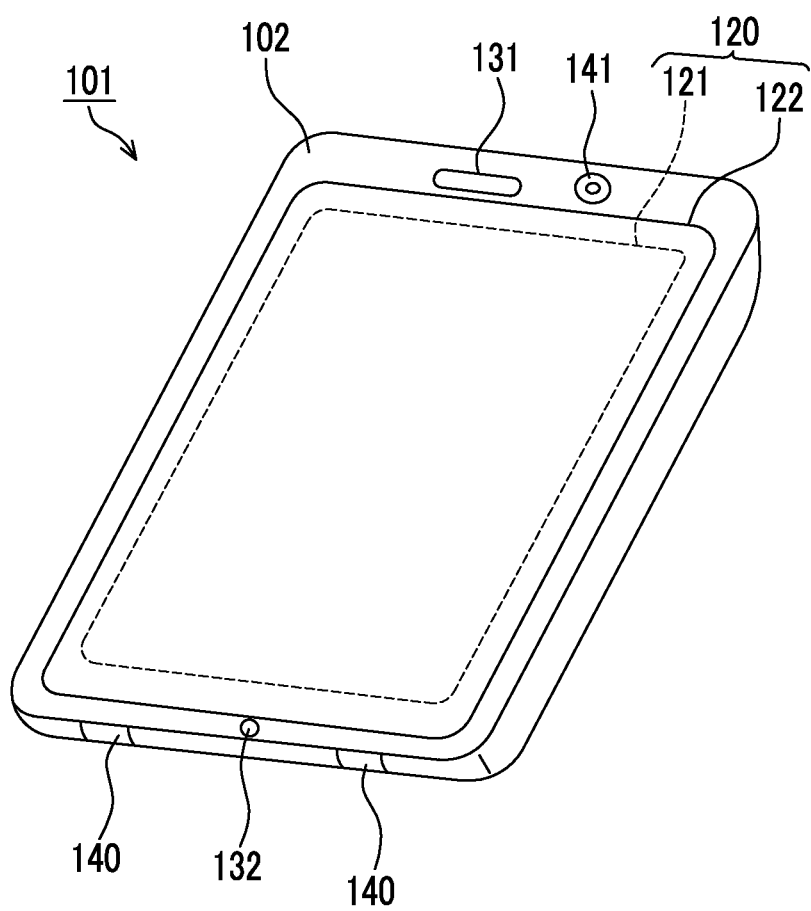
FIG. 19 is a diagram illustrating the outward appearance of a smart phone which is an embodiment of the imaging apparatus according to the invention.

FIG. 19 illustrates the outward appearance of a smart phone 101 which is an embodiment of the imaging apparatus according to the invention. The smart phone 101 illustrated in FIG. 19 includes a housing 102 with a flat panel shape. The smart phone 101 is provided with a display input unit 120 having a display panel 121 as a display unit and an operation panel 122 as an input unit which are integrally formed on one surface of the housing 102. The housing 102 includes a speaker 131, a microphone 132, an operation unit 140, and a camera unit 141. However, the structure of the housing 102 is not limited thereto. For example, the display unit and the input unit may be independently provided or the housing 102 may have a folding structure or a sliding mechanism.

Figure 20:
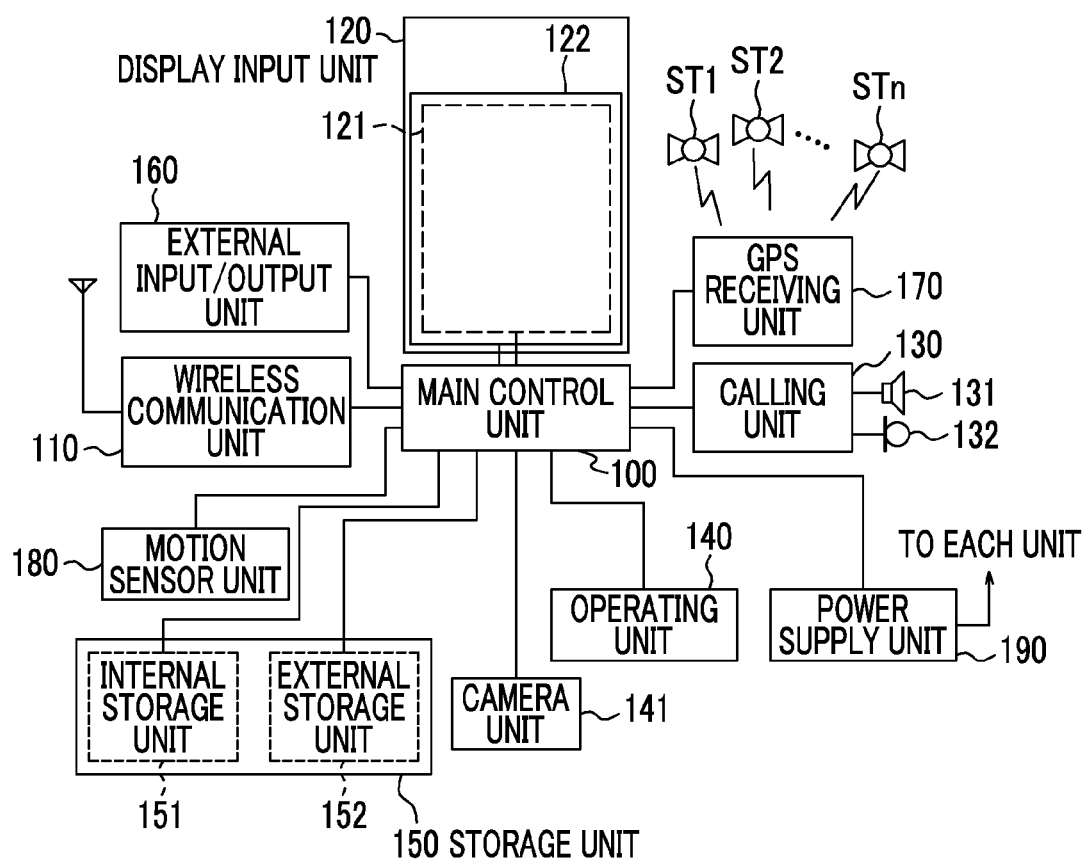
FIG. 20 is a block diagram illustrating the structure of the smart phone illustrated in FIG. 19.

FIG. 20 is a block diagram illustrating the structure of the smart phone 101 illustrated in FIG. 19. As illustrated in FIG. 20, the smart phone 101 includes, as main components, a wireless communication unit 110, the display input unit 120, a calling unit 130, the operation unit 140, the camera unit 141, a storage unit 150, an external input/output unit 160, a global positioning system (GPS) receiving unit 170, a motion sensor unit 180, a power supply unit 190, and a main control unit 100. In addition, the smart phone 101 has, as a main function, a wireless communication function which performs mobile wireless communication through a base station apparatus and a mobile communication network.

The wireless communication unit 110 performs wireless communication with the base station apparatus connected to the mobile communication network in response to a command from the main control unit 100. The wireless communication is used to transmit and receive various types of file data, such as voice data and image data, and electronic mail data or to receive, for example, web data or streaming data.

The display input unit 120 is a so-called touch panel comprising the display panel 121 and the operation panel 122. The display input unit 120 displays, for example, images (still images and motion pictures) or text information to visually transmit information to the user and detects the user's operation for the displayed information under the control of the main control unit 100.

The display panel 121 uses, for example, a liquid crystal display (LCD) or an organic electro-luminescence display (OELD) as a display device. The operation panel 122 is a device that is provided such that an image displayed on a display surface of the display panel 121 can be visually recognized and detects one or a plurality of coordinate points operated by a finger of the user or a stylus. When the device is operated by a finger of the user or a stylus, the operation panel 122 outputs a detection signal which is generated by the operation to the main control unit 100. Then, the main control unit 100 detects an operation position (coordinates) on the display panel 121 on the basis of the received detection signal.

As illustrated in FIG. 19, the display panel 121 and the operation panel 122 of the smart phone 101 that is exemplified as an embodiment of the imaging apparatus according to the invention are integrated to form the display input unit 120 and the operation panel 122 is provided so as to completely cover the display panel 121. In a case in which this arrangement is used, the operation panel 122 may have a function of detecting the user's operation even in a region other than the display panel 121. In other words, the operation panel 122 may include a detection region (hereinafter, referred to as a "display region") for an overlap portion which overlaps the display panel 121 and a detection region (hereinafter, referred to as a "non-display region") for an outer edge portion which does not overlap the display panel 121.

The size of the display region may be exactly equal to the size of the display panel 121. However, the sizes are not necessarily equal to each other. The operation panel 122 may include two sensitive regions, that is, an outer edge portion and an inner portion other than the outer edge portion. The width of the outer edge portion is appropriately designed according to, for example, the size of the housing 102. Examples of a position detection method which is used in the operation panel 122 include a matrix switching method, a resistive film method, a surface elastic wave method, an infrared method, an electromagnetic induction method, and a capacitive sensing method. Any of the methods may be used.

The calling unit 130 includes the speaker 131 and the microphone 132. The calling unit 130 converts the voice of the user which is input through the microphone 132 into voice data which can be processed by the main control unit 100 and outputs the converted voice data to the main control unit 100. In addition, the calling unit 130 decodes voice data received by the wireless communication unit 110 or the external input/output unit 160 and outputs the decoded voice data from the speaker 131. As illustrated in FIG. 19, for example, the speaker 131 can be mounted on the same surface as the display input unit 120 and the microphone 132 can be mounted on the side surface of the housing 102.

The operation unit 140 is a hardware key which uses, for example, a key switch and receives commands from the user. For example, as illustrated in FIG. 19, the operation unit 140 is a push button switch which is mounted on the side surface of the housing 102 of the smart phone 101, is turned on when it is pressed by, for example, a finger, and is turned off by the restoring force of a spring when the finger is taken off.

The storage unit 150 stores a control program or control data of the main control unit 100, application software, address data which is associated with, for example, the names or phone numbers of communication partners, transmitted and received electronic mail data, web data which is downloaded by web browsing, or downloaded content data. In addition, the storage unit 150 temporarily stores, for example, streaming data. The storage unit 150 includes an internal storage unit 151 which is provided in the smart phone and an external storage unit 152 which has a slot for a detachable external memory. The internal storage unit 151 and the external storage unit 152 forming the storage unit 150 may be implemented by a storage medium, such as a flash memory, a hard disk, a multimedia-card-micro-type memory, a card-type memory (for example, a MicroSD (registered trademark) memory), a random access memory (RAM), or a read only memory (ROM).

The external input/output unit 160 functions as an interface with all of the external apparatuses connected to the smart phone 101 and is directly or indirectly connected to other external apparatuses by communication (for example, universal serial bus (USB) or IEEE1394 defined by The Institute of Electrical and Electronics Engineers, Inc. (IEEE)) or a network (for example, the Internet, a wireless local area network (LAN), a Bluetooth (registered trademark) network, a radio frequency identification (RFID) network, an infrared data association (IrDA) (registered trademark) network, an ultra wideband (UWB) (registered trademark) network, or a ZigBee (registered trademark) network).

Examples of the external apparatus connected to the smart phone 101 include a wired/wireless headset, a wired/wireless external charger, a wired/wireless data port, a memory card or a subscriber identity module (SIM)/user identity module (UIM) card which is connected through a card socket, an external audio/video apparatus which is connected through an audio/video input/output (I/O) terminal, an external audio/video apparatus which is wirelessly connected, a smart phone which is connected wirelessly or in a wired manner, a personal computer which is connected wirelessly or in a wired manner, a PDA which is connected wirelessly or in a wired manner, and an earphone which is connected wirelessly or in a wired manner. The external input/output unit 160 may transmit data which is received from the external apparatus to each component of the smart phone 101 or may transmit data in the smart phone 101 to the external apparatus.

The GPS receiving unit 170 receives GPS signals transmitted from GPS satellites ST1 and ST2 to STn and performs a position measurement process on the basis of a plurality of received GPS signals to detect a position specified by the latitude, longitude, and height of the smart phone 101, in response to a command from the main control unit 100. In a case in which the GPS receiving unit 170 can acquire positional information from the wireless communication unit 110 or the external input/output unit 160 (for example, a wireless LAN), it can detect the position using the positional information.

The motion sensor unit 180 includes, for example, a triaxial acceleration sensor and detects the physical movement of the smart phone 101 in response to a command from the main control unit 100. When the physical movement of the smart phone 101 is detected, the moving direction or acceleration of the smart phone 101 is detected. The detection result is output to the main control unit 100.

The power supply unit 190 supplies power which is stored in a battery (not illustrated) to each unit of the smart phone 101 in response to a command from the main control unit 100.

The main control unit 100 includes a microprocessor, operates on the basis of the control program or control data stored in the storage unit 150, and controls the overall operation of each unit of the smart phone 101. The main control unit 100 has an application processing function and a mobile communication control function of controlling each unit of a communication system in order to perform voice communication or data communication through the wireless communication unit 110.

The application processing function is implemented by the operation of the main control unit 100 based on the application software which is stored in the storage unit 150. Examples of the application processing function include an infrared communication function which controls the external input/output unit 160 such that data communication with an opposing apparatus is performed, an electronic mail function which transmits and receives electronic mail, and a web browsing function which browses web pages.

The main control unit 100 has, for example, an image processing function which displays a video on the display input unit 120 on the basis of image data (still image data or motion picture data) such as received data or downloaded streaming data. The image processing function means the function of the main control unit 100 which decodes the image data, performs image processing on the decoding result, and displays the image obtained through the image processing on the display input unit 120.

The main control unit 100 performs display control for the display panel 121 and operation detection control for detecting the operation of the user through the operation unit 140 and the operation panel 122.

The main control unit 100 performs the display control to display a software key, such as an icon for starting application software or a scroll bar, or to display a window for creating electronic mail. The scroll bar means a software key for receiving a command to move a displayed portion of an image that is too large to fit into the display region of the display panel 121.

The main control unit 100 performs the operation detection control to detect the operation of the user input through the operation unit 140, to receive an operation for the icon or the input of a character string to an input field of the window through the operation panel 122, or to receive a request to scroll the displayed image through the scroll bar.

In addition, the main control unit 100 has a touch panel control function that performs the operation detection control to determine whether the position of an operation for the operation panel 122 is an overlap portion (display region) which overlaps the display panel 121 or an outer edge portion (non-display region) which does not overlap the display panel 121 other than the overlap portion and controls a sensitive region of the operation panel 122 or the display position of the software key.

The main control unit 100 can detect a gesture operation for the operation panel 122 and can perform a predetermined function according to the detected gesture operation. The gesture operation does not mean a simple touch operation according to the related art, but means an operation which draws a trace using a finger, an operation which designates a plurality of positions at the same time, or a combination thereof which draws a trace for at least one of the plurality of positions.

The camera unit 141 is a digital camera which electronically captures an image using an imaging element such as a complementary metal oxide semiconductor (CMOS) sensor. In addition, the camera unit 141 can convert captured image data into image data which is compressed in, for example, a Joint Photographic Experts Group (JPEG) format, and store the converted image data in the storage unit 150, or output the converted image data through the external input/output unit 160 or the wireless communication unit 110, under the control of the main control unit 100. As illustrated in FIG. 19, the camera unit 141 is mounted on the same surface as the display input unit 120 in the smart phone 101. However, the mounting position of the camera unit 141 is not limited thereto. For example, the camera unit 141 may not be mounted on the front surface of the housing 102 on which the display input unit 120 is provided, but may be mounted on the rear surface of the housing 102. Alternatively, a plurality of camera units 141 may be mounted on the housing 102. In a case in which a plurality of camera units 141 are mounted, the camera units 141 which are used to capture images may be switched such that a single camera unit 141 captures images or the plurality of camera units 141 may be simultaneously used to capture images.

The camera unit 141 can be used for various functions of the smart phone 101. For example, the image captured by the camera unit 141 may be displayed on the display panel 121 or the image captured by the camera unit 141 may be used as one of the operation input methods of the operation panel 122. When the GPS receiving unit 170 detects the position, the position may be detected with reference to the image from the camera unit 141. In addition, the optical axis direction of the camera unit 141 in the smart phone 101 may be determined or the current usage environment may be determined, with reference to the image from the camera unit 141, using the triaxial acceleration sensor or without using the triaxial acceleration sensor. Of course, the image from the camera unit 141 may be used in the application software.

For example, the positional information which is acquired by the GPS receiving unit 170, the voice information which is acquired by the microphone 132 (for example, the main control unit may convert the voice information into text information), and the posture information which is acquired by the motion sensor unit 180 may be added to the data of a still image or a motion picture and the data may be stored in the storage unit 150 or may be output through the external input/output unit 160 or the wireless communication unit 110.

For example, the image processing device 27 and the terminal controller 62 illustrated in FIG. 18 can be implemented by the main control unit 100 illustrated in FIG. 20.

EXPLANATION OF REFERENCES

- 10: camera apparatus
- 11: dome cover
- 12: curved portion
- 13: planar portion
- 14: camera unit
- 15: optical system
- 16: imaging element
- 18: direction driving unit
- 19: pan mechanism
- 20: tilt mechanism
- 22: discontinuous portion
- 24: degraded region information storage unit
- 25: camera controller
- 26: camera communication unit
- 27: image processing device
- 28: data memory
- 30: direction recognition unit
- 32: image correction unit
- 34: peculiar degradation correspondence portion
- 36: image data
- 38: peculiar degraded region
- 39: image-quality-degraded portion
- 40: degraded region information for each direction
- 41: imaging direction data
- 42: degraded region data
- 43: degradation characteristic data
- 46: degraded region calculation unit
- 47: optical characteristic information
- 48: camera specification information
- 49: direction information
- 50: process control unit
- 51: degraded region recognition unit
- 60: user terminal
- 61: terminal communication unit
- 62: terminal controller
- 63: display unit
- 64: operation unit
- 100: main control unit
- 101: smart phone
- 102: housing
- 110: wireless communication unit
- 120: display input unit
- 121: display panel
- 122: operation panel
- 130: calling unit
- 131: speaker
- 132: microphone
- 140: operation unit
- 141: camera unit
- 150: storage unit
- 151: internal storage unit
- 152: external storage unit
- 160: external input/output unit
- 170: GPS receiving unit
- 180: motion sensor unit
- 190: power supply unit

What is claimed is:

1. A camera apparatus comprising:
a dome cover;
a camera including an optical system that is provided on a rear surface side of the dome cover and an imaging element that outputs image data on the basis of imaging light received through the dome cover and the optical system;
a processor configured to drive the optical system to change an imaging direction;
a degraded region information storage device that stores degraded region information for each direction in which the imaging direction and degraded region data indicating a peculiar degraded region in the image data are associated with each other,
wherein the processor is further configured to recognize the imaging direction; and
an image processor configured to acquire the degraded region data associated with the imaging direction that is recognized on the basis of the degraded region information for each direction and perform an image quality improvement process for the image data on the basis of the peculiar degraded region indicated by the degraded region data,
wherein the peculiar degraded region is a region related to a degradation element which is caused by at least one of the dome cover or the optical system and is based on at least one of a spatial frequency or signal intensity.

2. The camera apparatus according to claim 1, wherein the degradation element is caused by a refractive index of at least one of the dome cover or the optical system.

3. The camera apparatus according to claim 1, wherein the degradation element is caused by transmittance of at least one of the dome cover or the optical system.

4. The camera apparatus according to claim 1, wherein the degradation element is at least one of image blur or image streaks.

5. The camera apparatus according to claim 1,
wherein the image quality improvement process includes at least one of a deconvolution process, an unsharp masking process, or a gain adjustment process.

6. The camera apparatus according to claim 1,
wherein the peculiar degraded region is a region indicating the degradation element, and
wherein the image processor is further configured to perform the image quality improvement process for the peculiar degraded region.

7. The camera apparatus according to claim 1,
wherein the image processor is further configured to analyze the image data to specify an image-quality-degraded portion indicating the degradation element in the peculiar degraded region of the image data and perform the image quality improvement process for the image-quality-degraded portion.

8. The camera apparatus according to claim 1,
wherein the degraded region information storage device stores the degraded region information for each direction which is specified on the basis of the peculiar degraded region determined according to optical characteristic information indicating optical characteristics of at least one of the dome cover or the optical system, camera specification information indicating characteristics of the camera, and direction information indicating a range of the imaging direction which is capable of being changed by the processor.

9. The camera apparatus according to claim 1,
wherein the processor is further configured to:
analyze the image data to specify the peculiar degraded region,
control at least the imaging element, and the degraded region information storage device,
direct the imaging element to output the image data related to a plurality of imaging directions, specify the peculiar degraded region related to each of the plurality of imaging directions, and store the degraded region information for each direction in which the imaging direction and the degraded region data indicating the peculiar degraded region that is specified are associated with each other in the degraded region information storage device in advance.

10. The camera apparatus according to claim 9,
wherein the processor is further configured to specify degradation characteristics of the peculiar degraded region related to each of the plurality of imaging directions and store the degraded region information for each direction in which the degraded region data, the imaging direction, and the degradation characteristics are associated with each other in the degraded region information storage device.

11. The camera apparatus according to claim 10,
wherein the image processor is further configured to acquire the degraded region data and the degradation characteristics associated with the imaging direction that are recognized on the basis of the degraded region information for each direction and perform the image quality improvement process on the basis of the degradation characteristics and the peculiar degraded region indicated by the degraded region data.

12. The camera apparatus according to claim 1,
wherein the image processor is further configured to perform a distortion correction process of correcting distortion of the optical system for the image data before the image quality improvement process.

13. The camera apparatus according to claim 1,
wherein the degraded region data is coordinate data indicating a position of each pixel forming the peculiar degraded region in the image data.

14. The camera apparatus according to claim 1,
wherein the degraded region data is function data indicating the peculiar degraded region in the image data.

15. The camera apparatus according to claim 1,
wherein the dome cover includes a discontinuous portion in which a change in the curvature of at least a rear surface of a front surface and the rear surface is discontinuous.

16. The camera apparatus according to claim 15,
wherein the dome cover includes a curved portion in which at least the rear surface of the front surface and the rear surface is a curved surface and a planar portion in which at least the rear surface of the front surface and the rear surface is a flat surface, and
the discontinuous portion is formed by a connection portion between the curved portion and the planar portion.

17. The camera apparatus according to claim 15,
wherein the peculiar degraded region includes a region of the image data which is related to the degradation element caused by the discontinuous portion of the dome cover.

18. The camera apparatus according to claim 1,
wherein the peculiar degraded region includes a region of the image data which is related to the degradation element caused by a light shielding portion of the dome cover.

19. An image processing device that acquires image data and imaging direction data indicating an imaging direction of the image data, acquires degraded region data which indicates a peculiar degraded region of the image data and is associated with the imaging direction data on the basis of degraded region information for each direction in which the degraded region data and the imaging direction are associated with each other, and performs an image quality improvement process for the image data on the basis of the peculiar degraded region indicated by the acquired degraded region data.

20. An image processing method comprising:
a step of acquiring image data which is output from an imaging element on the basis of imaging light received through a dome cover and an optical system;
a step of recognizing an imaging direction when the image data is acquired; and
a step of acquiring degraded region data which indicates a peculiar degraded region in the image data and is associated with the imaging direction when the image data is acquired on the basis of degraded region information for each direction in which the degraded region data and the imaging direction are associated with each other and performing an image quality improvement process for the image data on the basis of the peculiar degraded region indicated by the degraded region data,
wherein the peculiar degraded region is a region related to a degradation element which is caused by at least one of the dome cover or the optical system and is based on at least one of a spatial frequency or signal intensity.

* * * * *